United States Patent
Cline, Jr. et al.

(10) Patent No.: US 8,712,831 B2
(45) Date of Patent: Apr. 29, 2014

(54) METHOD AND SYSTEM FOR QUANTIFYING VIEWER AWARENESS OF ADVERTISING IMAGES IN A VIDEO SOURCE

(75) Inventors: William Russell Cline, Jr., Lee's Summit, MO (US); Gerald Bruce Williams, Liberty, MO (US); David Thomas Feyerabend, Blue Springs, MO (US); Jasvindarjit Singh, Lawrence, KS (US); Neal Arjuna Sharma, Olathe, KS (US)

(73) Assignee: Repucom America, LLC, Dover, DE (US)

( * ) Notice: Subject to any disclaimer, the term of this patent is extended or adjusted under 35 U.S.C. 154(b) by 3074 days.

(21) Appl. No.: 10/993,185

(22) Filed: Nov. 19, 2004

(65) Prior Publication Data
US 2006/0174261 A1    Aug. 3, 2006

(51) Int. Cl.
*G06Q 30/00* (2012.01)

(52) U.S. Cl.
USPC .......................................................... 705/14

(58) Field of Classification Search
USPC .......................................................... 705/14
See application file for complete search history.

(56) References Cited

U.S. PATENT DOCUMENTS

| | | | |
|---|---|---|---|
| 5,512,933 A | 4/1996 | Wheatley et al. | |
| 5,748,263 A | 5/1998 | Ball | |
| 5,819,259 A | 10/1998 | Duke-Moran et al. | |
| 5,870,151 A | 2/1999 | Korber | |
| 6,021,231 A | 2/2000 | Miyatake et al. | |
| 6,038,554 A | 3/2000 | Vig | |
| 6,100,925 A * | 8/2000 | Rosser et al. | 348/169 |
| 6,286,005 B1 | 9/2001 | Cannon | |
| 6,292,688 B1 | 9/2001 | Patton | |
| 6,431,985 B1 | 8/2002 | Kim | |
| 6,469,749 B1 | 10/2002 | Dimitrova et al. | |
| 6,671,676 B1 | 12/2003 | Shacham | |
| 6,760,916 B2 | 7/2004 | Holtz et al. | |
| 6,820,277 B1 * | 11/2004 | Eldering et al. | 725/35 |

(Continued)

FOREIGN PATENT DOCUMENTS

| | | |
|---|---|---|
| EP | 0593202 B1 | 3/1977 |
| EP | 0377515 A2 | 7/1990 |

(Continued)

OTHER PUBLICATIONS

Homer, Pamela M. (1995), "Ad Size as an Indicator of Perceived Advertising Cost and Effort: The Effects on Memory and Perceptions," Journal of Advertising, Winter 95, vol. 24, p. 1.

(Continued)

*Primary Examiner* — Alvin L Brown
(74) *Attorney, Agent, or Firm* — Shook, Hardy & Bacon L.L.P.

(57) ABSTRACT

Methods and media are provided for quantifying viewer awareness of advertising images in a video source is provided. According to one embodiment, a media source is segmented into a set of frames, which are annotated with attributes based on the images that appear within each frame. The attribute data is analyzed to determine detections that meet provided criteria. The detections are indexed based on the attributes, which are then supplemented with additional attributes to create one or more valuation factors. The valuation factors can be used to derive a discount factor that can be applied against a benchmark, such as the 30-second spot rate, to determine a value associated with the video source.

16 Claims, 29 Drawing Sheets

(56) References Cited

U.S. PATENT DOCUMENTS

| | | | |
|---|---|---|---|
| 7,047,242 B1* | 5/2006 | Ponte | 707/10 |
| 2001/0020236 A1 | 9/2001 | Cannon | |
| 2002/0046098 A1* | 4/2002 | Maggio | 705/14 |
| 2002/0056124 A1 | 5/2002 | Hay | |
| 2002/0062250 A1 | 5/2002 | Nangano et al. | |
| 2002/0072971 A1 | 6/2002 | DeBusk et al. | |
| 2002/0107721 A1 | 8/2002 | Darwent et al. | |
| 2002/0120925 A1* | 8/2002 | Logan | 725/9 |
| 2003/0050827 A1 | 3/2003 | Hennessey et al. | |
| 2003/0070167 A1 | 4/2003 | Holtz et al. | |
| 2003/0091237 A1 | 5/2003 | Cohen-Solal et al. | |
| 2003/0099459 A1 | 5/2003 | Yanagita et al. | |
| 2003/0101144 A1 | 5/2003 | Moreno | |
| 2003/0135460 A1 | 7/2003 | Talegon | |
| 2003/0191816 A1* | 10/2003 | Landress et al. | 709/219 |
| 2003/0226141 A1 | 12/2003 | Krasnow et al. | |
| 2003/0229536 A1 | 12/2003 | House et al. | |
| 2004/0073916 A1 | 4/2004 | Petrovic et al. | |
| 2004/0093296 A1 | 5/2004 | Phelan et al. | |
| 2004/0098744 A1 | 5/2004 | Gutta | |
| 2004/0204983 A1* | 10/2004 | Shen et al. | 705/10 |
| 2006/0230053 A1* | 10/2006 | Eldering | 707/101 |
| 2007/0061203 A1* | 3/2007 | Ellis et al. | 705/14 |
| 2007/0168413 A1* | 7/2007 | Barletta et al. | 709/203 |

FOREIGN PATENT DOCUMENTS

| | | |
|---|---|---|
| EP | 1137281 A2 | 9/2001 |
| EP | 1333666 A1 | 8/2003 |
| WO | WO 96/27983 A1 | 9/1996 |
| WO | WO 98/41934 A1 | 9/1998 |
| WO | WO 00/64165 A1 | 10/2000 |
| WO | WO 01/03041 A1 | 1/2001 |
| WO | WO 01/07985 A3 | 2/2001 |
| WO | WO 01/48665 A1 | 7/2001 |
| WO | WO 01/99416 A2 | 12/2001 |
| WO | WO 02/01471 A1 | 1/2002 |
| WO | WO 02/05121 A2 | 1/2002 |
| WO | WO 02/17146 A1 | 2/2002 |
| WO | WO 02/067587 A1 | 8/2002 |
| WO | WO 02/087244 A1 | 10/2002 |
| WO | WO 03/014949 A1 | 2/2003 |
| WO | WO 03/030011 A1 | 4/2003 |
| WO | WO 03/054654 A2 | 7/2003 |
| WO | WO 03/063041 A2 | 7/2003 |
| WO | WO 03/093930 A2 | 11/2003 |
| WO | WO 2004/004351 A1 | 1/2004 |
| WO | WO 2004/036352 A2 | 4/2004 |
| WO | WO 2004/068317 A2 | 8/2004 |

OTHER PUBLICATIONS

Rossiter, John, "Brain-Imaging Detection of Visual Scene Encoding in Long-Term Memory for TV Commercials," Journal of Advertising Research, Mar./Apr. 2001, vol. 41, Issue 2, p. 13.

Janiszewski, Chris, Meyvis, Tom, "Effects of Brand Logo Complexity, Repetition, and Spacing on Processing Fluency and Judgment," Journal of Consumer Research; Jun. 2001, vol. 28, p. 18.

Unnava, H. Rao, Sirdeshmukh, Deepak, "Reducing Competitive Ad Interference," Journal of Marketing Research, Aug. 1994, vol. 31, p. 403.

Zhao, Xinshu, "Clutter and Serial Order Redefined and Retested," Journal of Advertising Research, Sep./Oct. 1997, p. 57.

Borresen, C. Robert, Kauth, M, "Perception of Objects from Selected Parts," Journal of Psychology, vol. 126 (1), p. 93.

"Mass Media," Communications Daily, Apr. 25, 2002, vol. 22.

Shreve, Jenn, "Sites Unseen," Industry Standard, Mar. 19, 2001, vol. 4, p. 91.

Manning, Ric, "Publisher Pulls the Plug on Pioneer Portal Site," Boardwatch Magazine, Aug. 1, 1999, vol. 13, p. 32.

Nash, Jim, "Turning the Tide with Technology: EDI Could Transform the TV Ad Business, but it won't be Smooth Sailing," Computer World, Dec. 24, 1990, vol. 24, p. 47.

"TNS to Take on Evaliant Ad Monitoring in Acquisition," New Media Age, Jun. 13, 2002, p. 3.

Hardcastle, S., "Canned Goods: Leading Brands in the UK," Grocer, 2002, vol. 225, pp. 43-44.

Roberts, A., "Measuring the Short-Term Sales Effects of TV Adverstising," AdMap, 1998, vol. 33, pp. 50-52.

Gofton, Ken, "Charting the Market," Marketing, Sep. 24, 1998, pp. 45-51.

Pollack, Judann, "Marketers Slap Network TV on Survey on ROI," Advertising Age, vol. 74, Oct. 13, 2003, pp. 0, 66.

Paletta, L., A. Goyal, C. Greindl, "Selective Visual Attention in Object Detection Processes," Proceedings of the Spie—The International Society for Optical Engineering, 2003, vol. 5015, pp. 11-21.

Thomas, Daniel, "Sponsors' Data Breaks Down in an F1 Pit-Stop: A Review of Formula One Audience Data has Seen Viewer Numbers Slashed, Leaving Many Sponsors Doubting the Value of their Deals. But with No Industry Standard, Chaos Reigns," Marketing Week, Mar. 18, 2004.

"TV Doesn't Sell Package Goods Study Shows Medium Fails to Deliver ROI for Mature Brands," Advertising Age, May 24, 2004, vol. 75, p. 1.

Whitthaus, Michele, "Stakes are High when TV Channel Rates Rise," Precision Marketing, Aug. 4, 1997, p. 18.

Hendickson, Paula, "With '96 Ratings Slippage, Nets' Time Values Softens," Advertising Age, May 12, 1997, p. S8.

"Firms Using Research to Assess Sponsorship Value," Marketing News, Oct. 26, 1992, vol. 26, p. 13.

Flack, J.A., "Sports Sponsorship is a Team Game: Assessing the Value of Event Sponsorship," Marketing Week, Jul. 25, 2002, pp. 35-37.

Tyler, D., "Sponsorship: Why Bother?" Management Accounting, 1999, vol. 77, pp. 20-21.

Cornwell, B., S. Pruitt, R. Van Ness, The Value in Winning in Motorsports: Sponsorship Linked-Marketing, Journal of Advertising Research, Jan. 1, 2001, vol. 41, pp. 17-31.

"BIZ360 Secures Six New Partners to Extend Global Footprint and Real-Time Broadcast and Online Monitoring Capabilities Industry's Most Extensive Partner Network for Global Reputation and Brand Analysis Services," PR Newswire, Jun. 7, 2004.

LexisNexis and BIZ360 Form Alliance to Help Executives Manage Corporate Reputation and Build Brands; LexisNexis to Stream Access to XML News Content Into BIZ360's Market Intelligence Application, PR Newswire, Jun. 7, 2004.

IBM and National Football League Team for Sponsorship and Information Technology Agreement, Business Wire, Jul. 23, 2003.

Atlas DMT Unveils First-Ever Brand Exposure Duration Metric that Quantifies the Value of Rich Media Campaigns for Brand Advertisers, Business Wire, Jul. 14, 2003.

IDG's Computerworld.com Ranks Among Top Media Venues for Advertising Value; Recognition Validates Online Resource as 'Go To Site' for Enterprise IT News, Research, Business Wire, May 14, 2003.

"West Glen Communications Breaks Through Industry Measurement and Analysis Obstacles with Brand Dashboard (TM) from Cymfony; Only Broadcast PR Agency to Employ Advanced Analytics Software that Delivers Immediate Results," PR Newswire, Apr. 14, 2003.

"Super Bowl Advertising: KN Research Reveals How Captivated Viewers Deliver Big Win for Marketers; New Study Shows 65% Say Ads are as Interesting as Game," PR Newswire, Jan. 31, 2003.

HookMedia's Artemis Revolutionizes the Managment of Digital Advertising Campaigns; New Patent-Pending Data Mangement and Reporting Tool Maximized Effectiveness of Digital Media, Business Wire, Feb. 13, 2001.

"MatchLogic Announces Media and Advertising Planning Solution—..Maps —for Complete Online Campaign Managment," Business Wire, Aug. 18, 1999.

(56) References Cited

OTHER PUBLICATIONS

"Medialink Research Offers Syndicated Studies Analyzing Media Treatment of Auto, Television and Airline Brands," Business Wire, Oct. 29, 1998.

"New Tool Tells Marketers What Makes Event Attendees Purchase; Delahaye/FARsight Determines the Most Effective Elements of Trade Show & Sponsorship Programs," Business Wire, Oct. 28, 1997.

"ASKSMM. (Using Metrics to Evaluate Effectiveness of Marketing Media)," Sales & Marketing Managment, Feb. 1, 2003, vol. 155, p. 51.

Miyazaki, Anthony; A. Morgan, "Assessing Market Value of Event Sponsoring: Corporate Olympic Sponsorships," Journal of Advertising Research, Jan. 1, 2001, vol. 41, p. 9.

"Media Exposure Analysis," Microsoft Powerpoint.

* cited by examiner

```
<DetectSet>
<Header Version="1.0.0" />
    <Detect Key="924" FrameNumber="2541" LogoId="MtDew" SizeId="Small" LocationId="STH" />
    <Detect Key="925" FrameNumber="2541" LogoId="RightGuard" SizeId="Small" LocationId="STH" />
    <Detect Key="926" FrameNumber="2541" LogoId="TacoBell" SizeId="Small" LocationId="STH" />
    <Detect Key="927" FrameNumber="2542" LogoId="MtDew" SizeId="Small" LocationId="STH" />
    <Detect Key="928" FrameNumber="2542" LogoId="RightGuard" SizeId="Small" LocationId="STH" />
    <Detect Key="929" FrameNumber="2542" LogoId="TacoBell" SizeId="Small" LocationId="STH" />
    <Detect Key="930" FrameNumber="2543" LogoId="MtDew" SizeId="Small" LocationId="STH" />
    <Detect Key="931" FrameNumber="2544" LogoId="RightGuard" SizeId="Small" LocationId="STH" />
    <Detect Key="932" FrameNumber="2544" LogoId="TacoBell" SizeId="Small" LocationId="STH" />
    <Detect Key="933" FrameNumber="2544" LogoId="MtDew" SizeId="Small" LocationId="STH" />
    <Detect Key="934" FrameNumber="2544" LogoId="RightGuard" SizeId="Small" LocationId="STH" />
    <Detect Key="935" FrameNumber="2544" LogoId="TacoBell" SizeId="Small" LocationId="STH" />
```

TRI-ID Evaluation Report
Executive Summary

Client: Sample Client
Event: Sample Event
Event Date: mm/dd/yy to mm/dd/yy
Show: Sample Show
Network(s):: Sampel Network
Broadcast Date &Time: mm/dd/yy - hr:mn

~134~

Summary

| | | | |
|---|---|---|---|
| Total Televised Show Time (hh:mm:ss): | 1 | 31 | 10 |
| Sponsor Signage Exposure Time (hh:mm:ss): | 0 | 7 | 43 |
| Sponsor Signage as % of Televised Time: | | | 12.27% |
| Negotiated 30 sec. Spot Value: | | | $2,500.00 |
| Negotiated 30 sec Spot Discount: | | | 25% |

Signage Sponsor

| | a | b | c | d | e | g | h |
|---|---|---|---|---|---|---|---|
| | | | b/30 | b/a | h/a | | |
| | | total | | average | average | | |
| | | duration | total | detection | detection | | |
| | detections | (hh:mm:ss) | 30sec spots | duration | value | SVI™ | SMV™ |
| Sample Sponsor | 100 | 0 : 7 : 43 | 15.45 | 4.63 | $120.25 | 0.239 | $12,025.39 |

Detections by Source

| | a | b | c | d | e | g | h |
|---|---|---|---|---|---|---|---|
| | | | b/30 | b/a | h/a | | |
| | | total | | average | average | | |
| | | duration | total | detection | detection | | |
| Source | detections | (hh:mm:ss) | 30sec spots | duration | value | SVI™ | SMV™ |
| Fixed Signage | 46 | 0 : 3 : 21 | 6.69 | 4.36 | $118.31 | 0.258 | $5,442.44 |
| Bib Logo | 13 | 0 : 1 : 6 | 2.19 | 5.05 | $130.99 | 0.234 | $1,702.81 |
| Corral Signage | 13 | 0 : 1 : 12 | 2.41 | 5.56 | $119.67 | 0.183 | $1,555.68 |
| Start house Signage | 11 | 0 : 0 : 24 | 0.79 | 2.16 | $49.86 | 0.170 | $548.43 |
| Tower Signage (pipe) | 11 | 0 : 1 : 7 | 2.22 | 6.05 | $147.40 | 0.265 | $1,621.35 |
| Graphics | 4 | 0 : 0 : 22 | 0.72 | 5.43 | $191.97 | 0.313 | $767.90 |
| Rotational Signage | 2 | 0 : 0 : 13 | 0.42 | 6.35 | $193.39 | 0.292 | $386.77 |

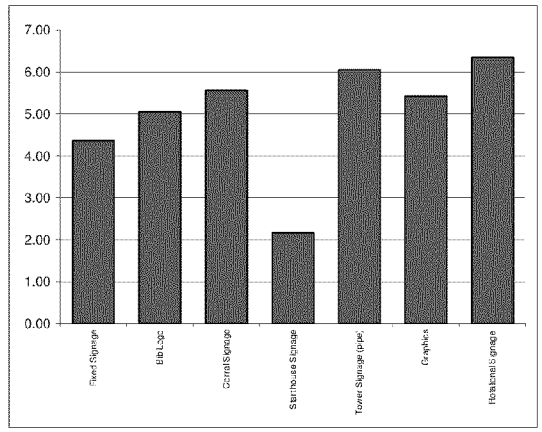
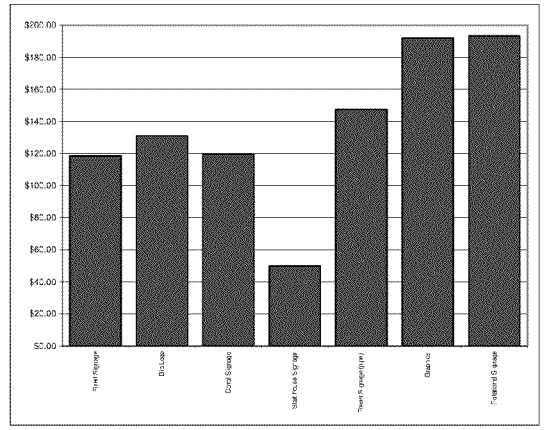

*FIG. 27.*

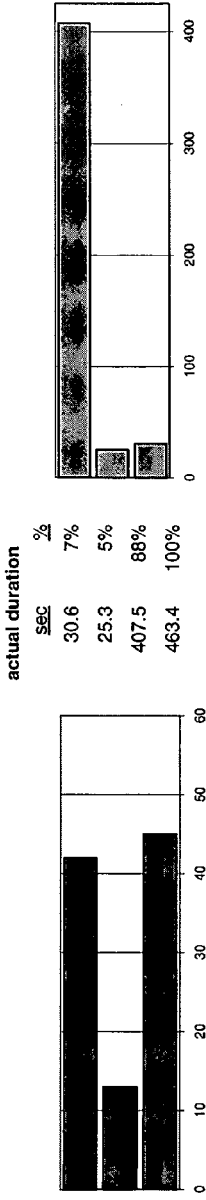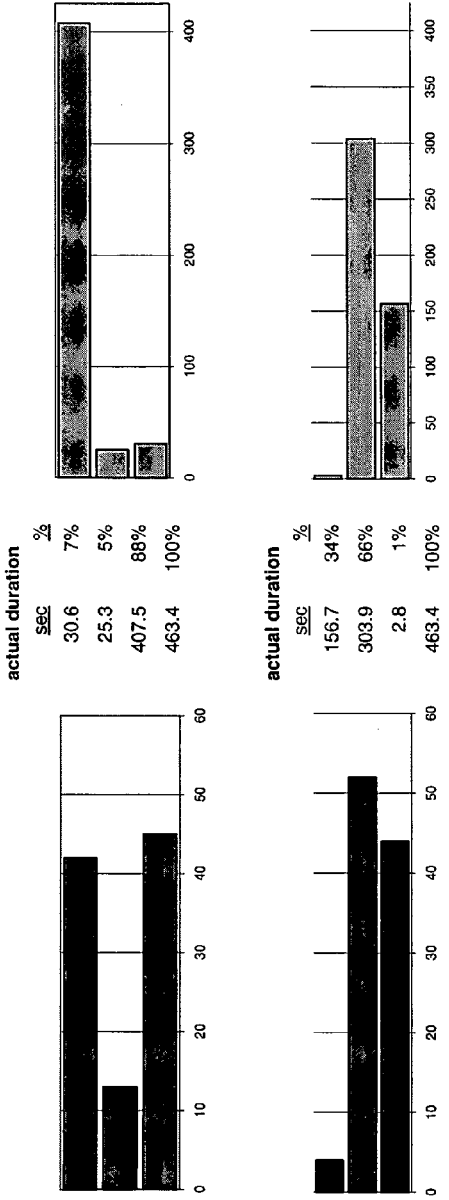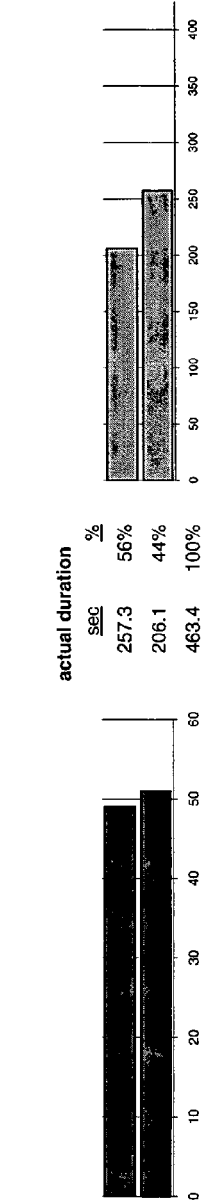
FIG. 28.

METHOD AND SYSTEM FOR QUANTIFYING VIEWER AWARENESS OF ADVERTISING IMAGES IN A VIDEO SOURCE

CROSS-REFERENCE TO RELATED APPLICATIONS

This application is related by subject matter to the invention disclosed in the commonly assigned application U.S. application Ser. No. 10/993,242, which was filed on even date herewith (Nov. 19, 2004).

STATEMENT REGARDING FEDERALLY SPONSORED RESEARCH OR DEVELOPMENT

Not applicable.

TECHNICAL FIELD

The present invention relates to providing valuing the financial impact of signage and sponsorships in a media-presentation environment.

BACKGROUND OF THE INVENTION

During televised events such as sporting events, reality shows, and other presentations, sponsors often use sponsorship advertising to market their products. Sponsorship advertising can take on a variety of forms, such as fixed signage, audio or visual graphics, apparel advertising, and the like. Unlike valuing a 30-second spot commercial, attempting to value sponsorship advertising has historically been a difficult, subjective, and uncertain process.

The world of advertising revolves precise duration horizons, such as the 30-second spot commercial. Almost all valuations of all forms of advertising stem from or are a function of the 30-second spot rate, which is the price paid by a company for a 30-second commercial. If a sponsor is unable to definitively and objectively ascertain metrics related to advertising data, then it will not be able to reliably value such data. These data elements, or metrics, would be important and useful various entities, such as the sponsor, an event presenter, networks or other rights holder.

A technique to try to determine occurrences of sponsorship information is to employ image-recognition technology. For example, Taylor Nelson Sofres plc of Westgate, London employs software developed by Lucent Technologies Inc. of Murray Hill, N.J. to attempt to match logos to templates. Also Margaux Matrix Limited of Godalming, Surry in Great Britain employs image-recognition technology to help identify advertising images. But the level of accuracy demanded in the industry is often too high to be met by the results obtained from image-recognition technology, which is often constrained to comparing image captures to provided templates.

Another shortcoming associated with image-recognition technology is overcoming the inherent difficulty of automatically determining the source of the signage. Signage may appear behind home plate at a baseball game, on the ball cap of a golfer, on the back wall of a stadium, on an automobile door, or in any other of almost innumerable places. Signage can also appear as a graphic (a computer animated object that appears on a viewer's television screen). No image-recognition technology has been demonstrated to accurately identify the source, distinguishing it from other sources. For instance, consider baseball stadium where the outfield is bounded by a wall with blue background, upon which is fixed a first logo. Consider a second logo that appears behind home plate, but is also on a blue background. If a camera were to zoom in on one of the logos (to capture a great catch in the outfield, or a missed catch by the catcher for example), then all that could be seen is the logo surrounded by blue. Finally, image-recognition technology often creates false hits (father positives or false negatives) that must be dealt with.

Thus, current techniques suffer from at least the exemplary shortcomings listed above, and also do not employ any form of detection indexing to arrive at an overall valuation factor or score related to sponsorship-advertising. Unfortunately, all detections are valued equally, even though some detections have greater impact potential than others. With an inability to quantify the potential impact associated with advertising seen during an event, decision makers are ill-equipped to determine the value of sponsorship advertising. The present state of the art could therefore be improved by providing a method and system for accurately and quantitatively valuing the potential impact of advertising content.

SUMMARY OF THE INVENTION

The present invention addresses at least the shortcomings above by providing a method and system to value and quantify both the potential impact that various images, such as advertisements including sponsorship logos and more, will have on a viewing audience. Moreover, the present invention provides a method and system to associate a monetary value to the impact of one or more images on a viewing audience. A discount factor is derived that can quantify a monetary value of a set of advertising images that appear during the course of an event.

Defined by the claims below, the present invention has several practical applications in the technical arts, not limited to reducing the time and resources associated with identifying advertisement images that occur during a presentation event, such as a sporting event; increasing the accuracy associated with identifying advertising images; providing a definite and objective measurement of the potential image impact of advertising images; reducing the complexity associated with identifying the advertising images; providing a distributed-processing environment that is monitorable and portable; enabling additional attributes (such as size, source, isolation or nonisolation, type, etc.) to be associated with individual detections; and memorializing various attributes associated with individual image occurrences in a rich and easy-to-understand format.

In a first aspect, a method is provided for quantifying potential viewer awareness of advertising images. The method comprises segmenting a source of media into various segments of interest, such as a set of detections; without employing image-recognition software, providing for the identification of advertising images (including logos, graphics, etc., as explained below) that appear in the segments; associating one or more attributes with each of the segments, wherein the one or more attributes include a size indication, a duration indication, and an isolation indication associated with the advertising images; based on the attributes, categorizing each of the segments into a defined category to derive a set of individual detection scores respectively associated with each set of the segments; and aggregating the individual detection scores to provide one or more valuation scores.

In a second aspect, a method is provided for quantifying potential viewer awareness of a set of sponsorship detections that appear in a video presentation. The method comprises associating detections within the video source with one or more attributes of interest (such as a size indication, a duration indication, and an isolation indication); without employing image-recognition software, providing a set of individual detection scores based on the attributes; and deriving a valuation of the set of images from the detection scores.

In a third illustrative aspect, a method for valuing advertising content is provided. The method comprises identifying from a video source a plurality of sponsorship images without employing image-recognition software; assigning attributes to each occurrence of the sponsorship images; based on the attributes, categorizing the occurrences into a set of categories; based on the categorizes, providing a set of indexes respectively associated with the occurrences; aggregating the occurrences; enriching the aggregated occurrences with additional valuation information; and providing from the enriched aggregation an index factor to be applied to an advertising-valuation benchmark.

Additional aspects of the invention will become clear upon reading the description below.

BRIEF DESCRIPTION OF THE SEVERAL VIEWS OF THE DRAWINGS

The present invention is described in detail below with reference to the attached drawing figures, which are incorporated in their entirety by reference herein, and wherein:

FIG. 25 depicts an illustrative detection report 132 in accordance with an embodiment of the present invention;

FIGS. 27 and 28 depict merely two illustrative reports of almost innumerable possible reports that can be generated according to one or more embodiments of the present invention.

DETAILED DESCRIPTION OF THE INVENTION

Figure 1:
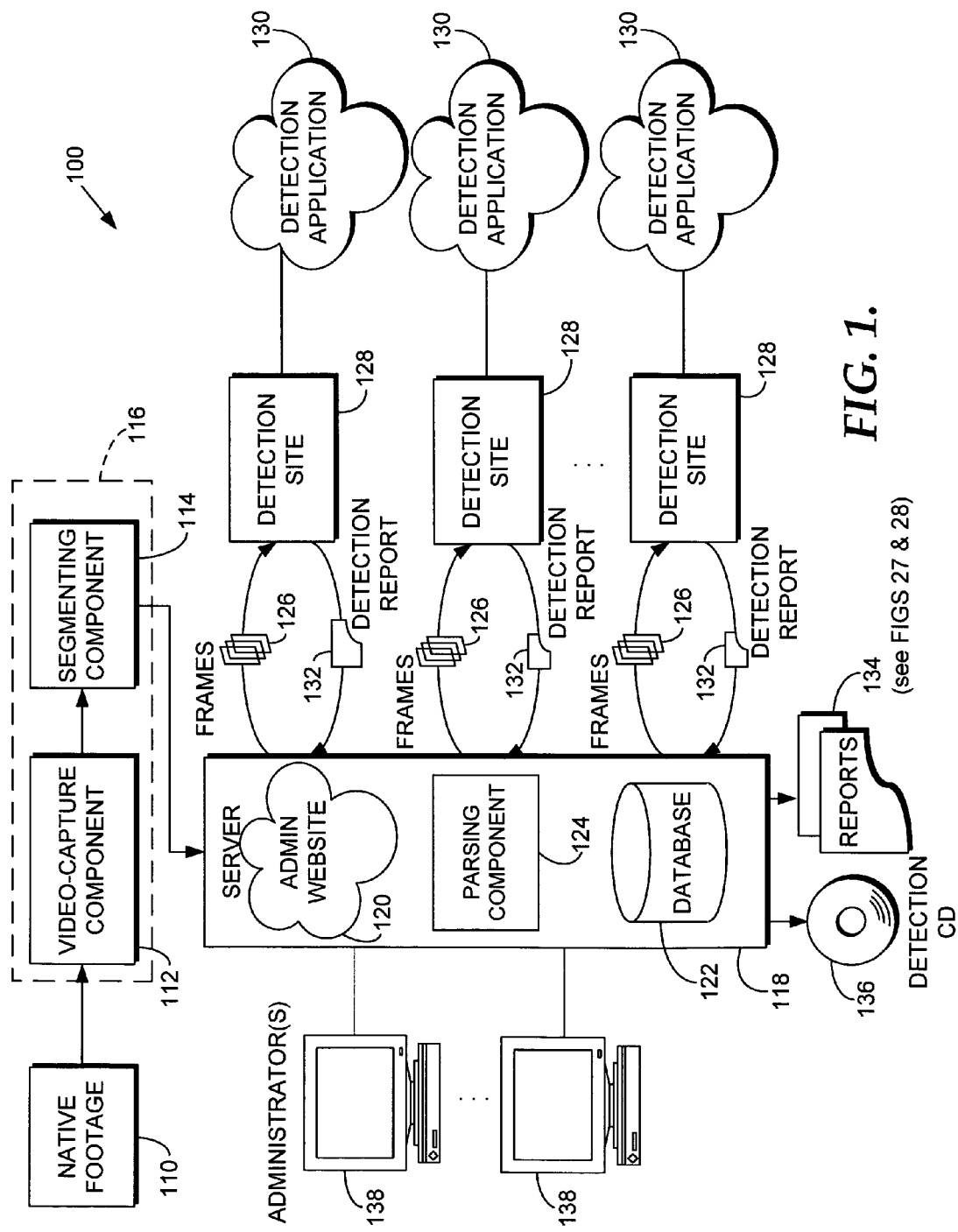
FIG. 1 is a block diagram illustrating an exemplary architecture in accordance with an embodiment of the present invention.

As previously mentioned, the present invention provides an objective method for determining and valuing a set of advertisement images that are presented to the viewing audience during the course of an event or portion thereof. Television networks and other event presenters have been unable to objectively determine the potential impact, and consequently a monetary value, associated with sponsorship advertising that is presented to an audience during the course of an event, such as a sporting event for example. But the present invention makes such objective valuation possible and reliable.

Specific hardware devices, programming languages, components, processes, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, workstations, and other machines may be connected to one another across a communication medium including, for example, a network or networks. That is, reference to objects such as "a server" contemplates multiple servers coupled together; and what is referenced herein as being performed perhaps on multiple machines, is understood to be capable of being performed on a single device.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. An illustrative list of such terms follows in Table 1:

TABLE 1

Acronyms and Shorthand Notation

| Name | Definition as used herein |
|---|---|
| Sponsorship | Brand exposure that employs signage, logos, graphics, marks, advertorials, verbal mentions, jingles etc. that are presented to a viewing audience during the course of an event, such as the sporting event. Sponsorship includes any form of advertising that seeks to establish a deeper association and integration between an advertiser and a publisher for example. Sponsorship can also include simple impressions. Sponsorship extends beyond an arrangement to exchange advertising for the responsibility of funding an event, but contemplates the actual advertising, etc. as well. |
| DAF | Duration Adjustment Factor |
| Detection | The occurrence of an image that persists for a desired duration |
| Detector | The entity that determines the presence of an advertisement image |
| Hit | The occurrence in a segment of a desired image |
| IDS | Individual Detection Score |
| IDS-cat | The IDS-cat of a detection class is a value indicating the relative value of an individual detection in that class |
| III | Image Impact Indicator - A measure of potential impact of a sponsorship or other entity to a viewing audience |
| IMI | Image Monetary Indicator - An indication of the monetary value associated with a set of advertisement images |

As one skilled in the art will appreciate, the present invention may be embodied as, among other things: a method, system, or computer-program product. Accordingly, the present invention may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by various machines such as computers, handheld devices, and dedicated devices. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to, RAM, ROM, EEPROM; flash memory or other memory technology; CD-ROM; digital versatile discs (DVD); holographic media or other optical disc storage; magnetic cassettes; magnetic tape; magnetic disk storage; and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media. What follows is a description of one or more preferred embodiments. The present invention is not limited to the following explanations.

Overview

Turning now to FIG. 1, a blocked diagram is provided that depicts an illustrative operating environment according to one embodiment of the present invention. Various aspects depicted in FIG. 1 will be explained in significantly greater detail below. The reference numerals of FIG. 1 are numbered to correspond to the figures that discuss the various elements in greater detail. The following comments are introductory in nature and intended to help provide a high-level overview of certain aspects of the present invention. Because of the high-level of abstraction depicted in FIG. 1, it should not be construed as limiting in nature. That is, the elements, relationships, and flows of FIG. 1 are illustrative in nature and should not be construed as limitations of the present invention.

With reference to FIG. 1, native footage 110 can be any source of media, including video, audio, data, and a combination of the there. Exemplary sources of media include a live television feed, previously recorded video embodied on media such as a DVD or VHS recording, analog video, digital video, Internet video, other streaming-media presentations, or compressed video such as MPEG video or proprietary formats such as that of RealNetworks, Inc (.ram or .rm files) or that of Apple Computer Inc. (Quicktime® videos). Any video embodied on either human- or machine-readable format is contemplated within the scope of native footage 10.

Video-capture component 112 receives native footage 110 and stores it for manipulation. Video-capture component 112 is coupled to segmenting component 114, which segments native footage 110 into a plurality of segments, such as frames. Segmenting component 114 and video-capture component 112 may be housed as a single unit as indicated by circumferential line 116.

Segmenting component 116 is coupled to a server 118, which includes an administrative website 120, a database component 122, and a parsing component 124. Server 118 receives a set of frames 126 from segmenting component 114 and communicates a set of frames 126 to respective detection sites, such as detection site 128. Detection site 128 includes a detection application 130, which will be explained in greater detail below, and facilitates the association of a plurality of data metrics to frames 126. Detection site 128 communicates a detection report 132 back to server 118. Detection report 132 includes a set of data items that can be analyzed to determine additional attributes associated with frames 126 and their content. As shown, server 118 is preferably in communication with multiple detection sites to facilitate a distributed-computing environment whereby multiple instances of detection processing can be implemented simultaneously.

Database component 122 can store a variety of information including the information associated with frames 126 vis-à-vis detection report 132. In addition to the data in detection report 132, output data that originates as a result of analyzing detection report 132 can also be stored in database 122. Parsing component 124 parses the data in detection report 132 to clean additional information and attributes associated with images in frames 126. Server 118 uses the data stored in database 122 to create a set of reports 134 (see FIGS. 27 & 28) or a detection CD 136. Reports 134 present the data gathered by server 118 in a variety of useful formats that are easy for humans to understand. Detection CD 136 includes qualifying detections that were observed during the detection process. An administrator 138 can access server 118 and its various functional aspects via administrative website 120.

Figure 2A:
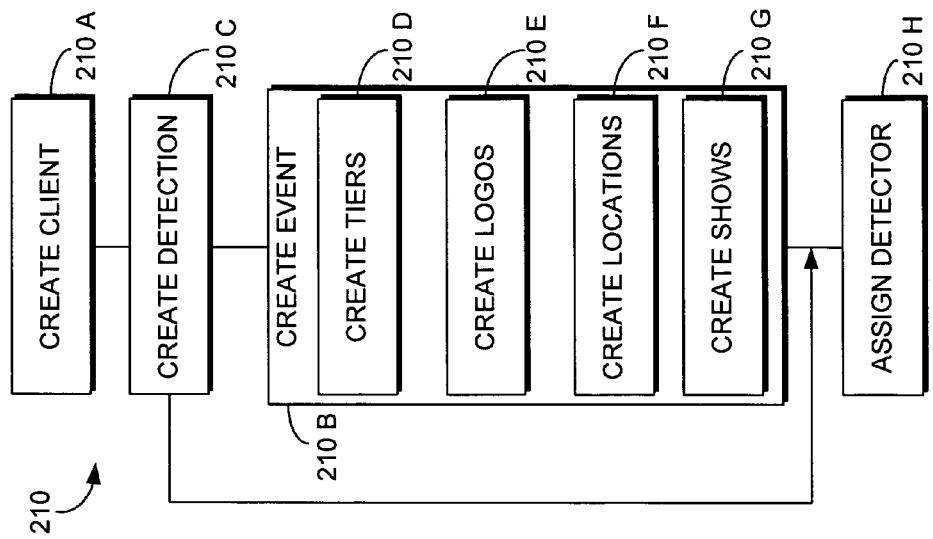
FIG. 2A is a flowchart depicting an illustrative method for performing various setup functions in accordance with an embodiment of the present invention.
Figure 2:
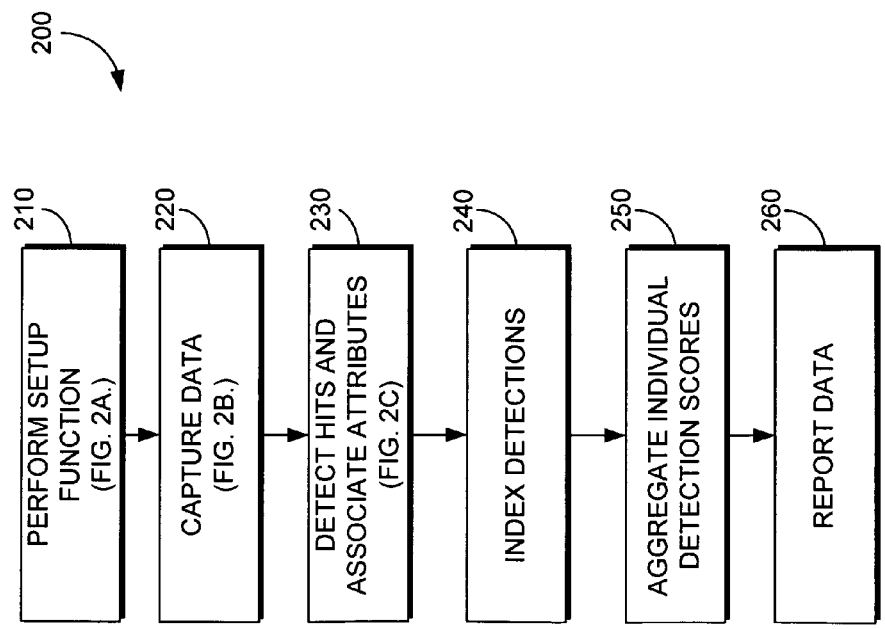
FIG. 2 is a flowchart depicting an exemplary method for valuing image content according to an embodiment of the present invention.

Turning now to FIG. 2, an illustrative method for valuing a set of advertisement images is provided according to an embodiment of the present invention. At a step 210, a set of set-up functions is preferably performed. Illustrative set-up functions include creating a client, creating detectors, creating an event, assigning detectors and more, which will be explained in greater detail below with reference to FIG. 2A. At a step 220, advertising-image data is captured, which will be discussed with reference to FIG. 2B. At a step 230, hits are detected and attributes are associated with those hits, as will be explained with reference to FIG. 2C. At a step 240, advertising image data is reported in a variety of formats, and will be explained in greater detail below.

Figure 3:
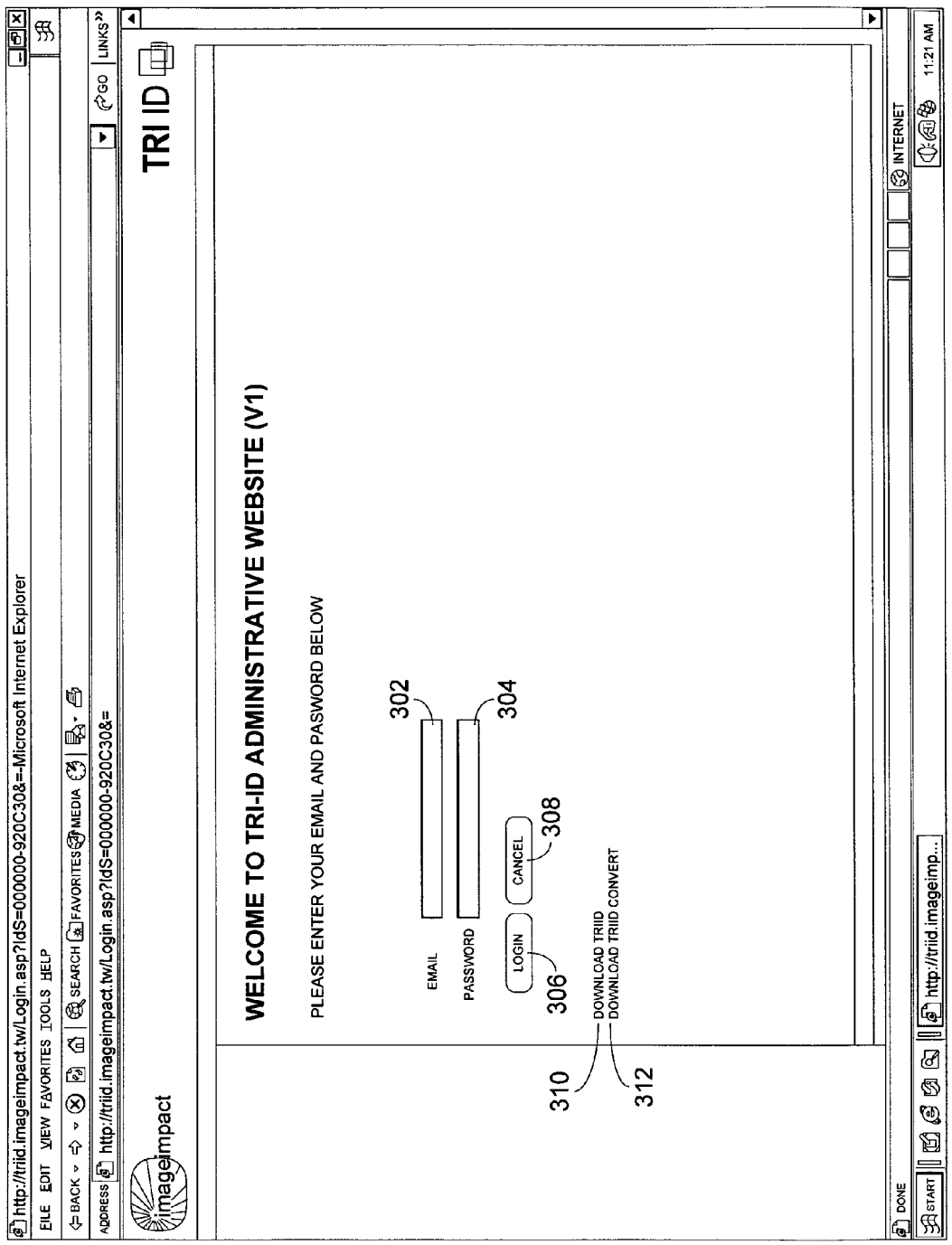
FIG. 3 is a screenshot depicting an exemplary login screen in accordance with an embodiment of the present invention.

Turning now to FIG. 2A, details associated with making and using administrative website 120, are depicted at a high level and will be described beginning with reference FIG. 3. FIG. three depicts a screenshot of a an exemplary administrative website 120 that presents an administrator with options to enter a set of security credentials. Although implementing a log-in environment is not a necessary aspect of the present invention, doing so adds an element of security that helps maintain integrity of the system. According to FIG. 3, an e-mail box 302 is provided along with a password box 304 to receive an administrator's user name and password. The user may log in by selecting a log-in button 306 or cancel via cancel button 308. If a scheme is selected whereby client components are necessary or enhance interaction with administrative website 120, those client-side applications may be downloaded by illustrative links 310 and 312. Selecting log-in button 306 with proper security credentials entered will cause the screen shot of FIG. 4 to be presented to administrator 138.

Figure 4:
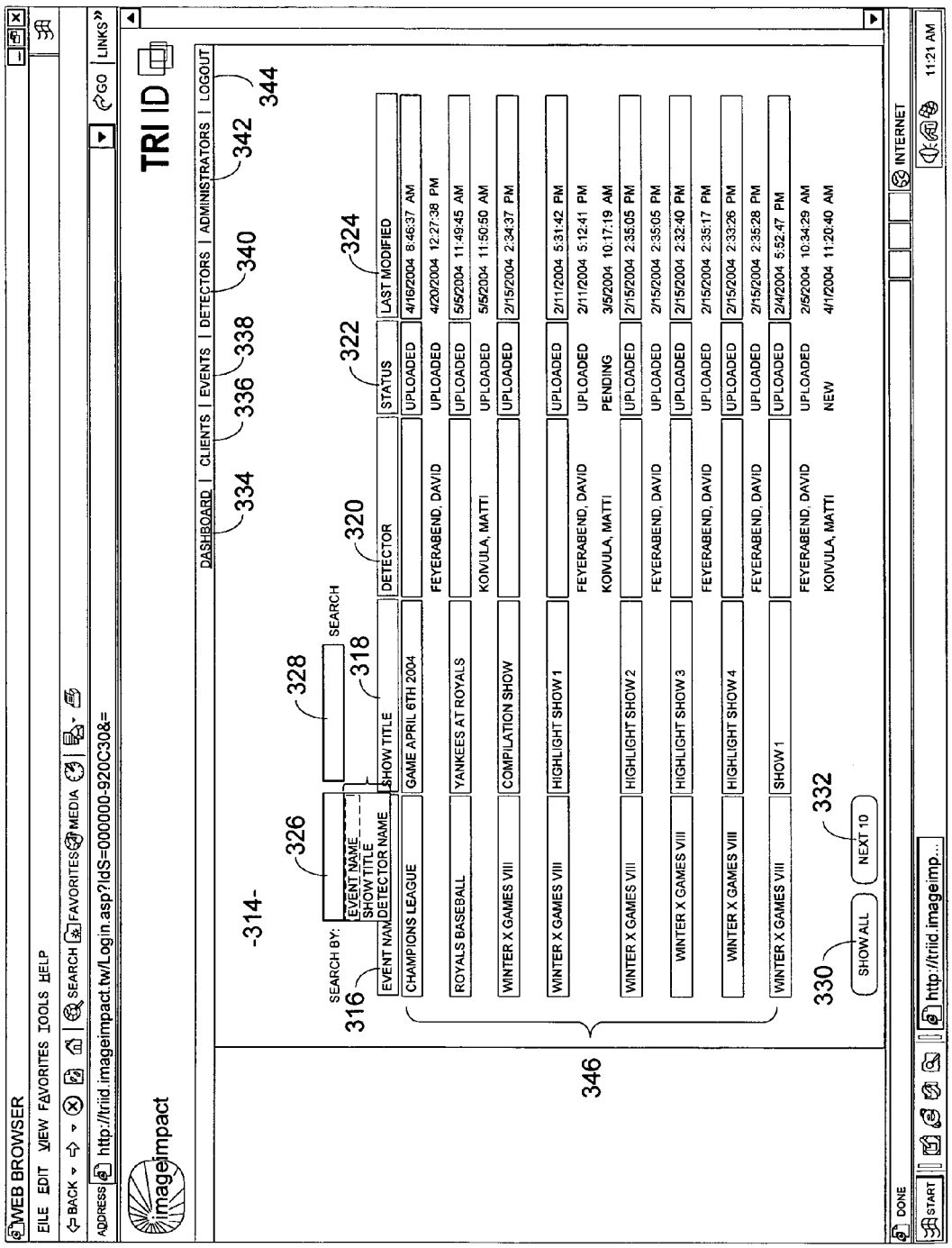
FIG. 4 depicts an illustrative screenshot of an exemplary overview screen that lists various projects and general information associated with each product in accordance with an embodiment of the present invention.

FIG. 4 depicts an introductory screen 314 that provides administrator 138 with an overview of projects and general information associated with each project. For example, an administrator may view the names of various events by observing event column 316. The show title is depicted in column 318, and a corresponding detector(s) can be observed via column 320. The current status of the detection process of each event is observable via column 322, and an associated time stamp via column 324. Administrator 138 can search for events using a drop-down menu 326 or by entering text into a search text box 328. Exemplary time-saving controls can also be included in the application, such as a "Show All" button 330 that shows all of the events available, and a "Next 10" button 332, which displays the next ten events.

Other links available on introductory screen 314 include a "Dashboard" link 334, which is a link to this screen 314; a "Clients" link 336, which links to the various client stored in database 122; and events link 338, which links to the various events stored database 122, a "Detectors" link 340, which presents the various detectors stored; and an "Administrator's" link 342, which presents a screen to modify attributes associated with administrators of the system. A log-out link 344 enables people to log-out at will. As can be seen in FIG. 4, a data grid 346, presents summary information associated with various events as previously mentioned. Those skilled in the art will appreciate that additional attributes could also be displayed on screen 314, which is illustrative in nature and indented to convey the concept of depicting in summary fashion various data elements associated with valuing a set of advertising images.

Figure 5:
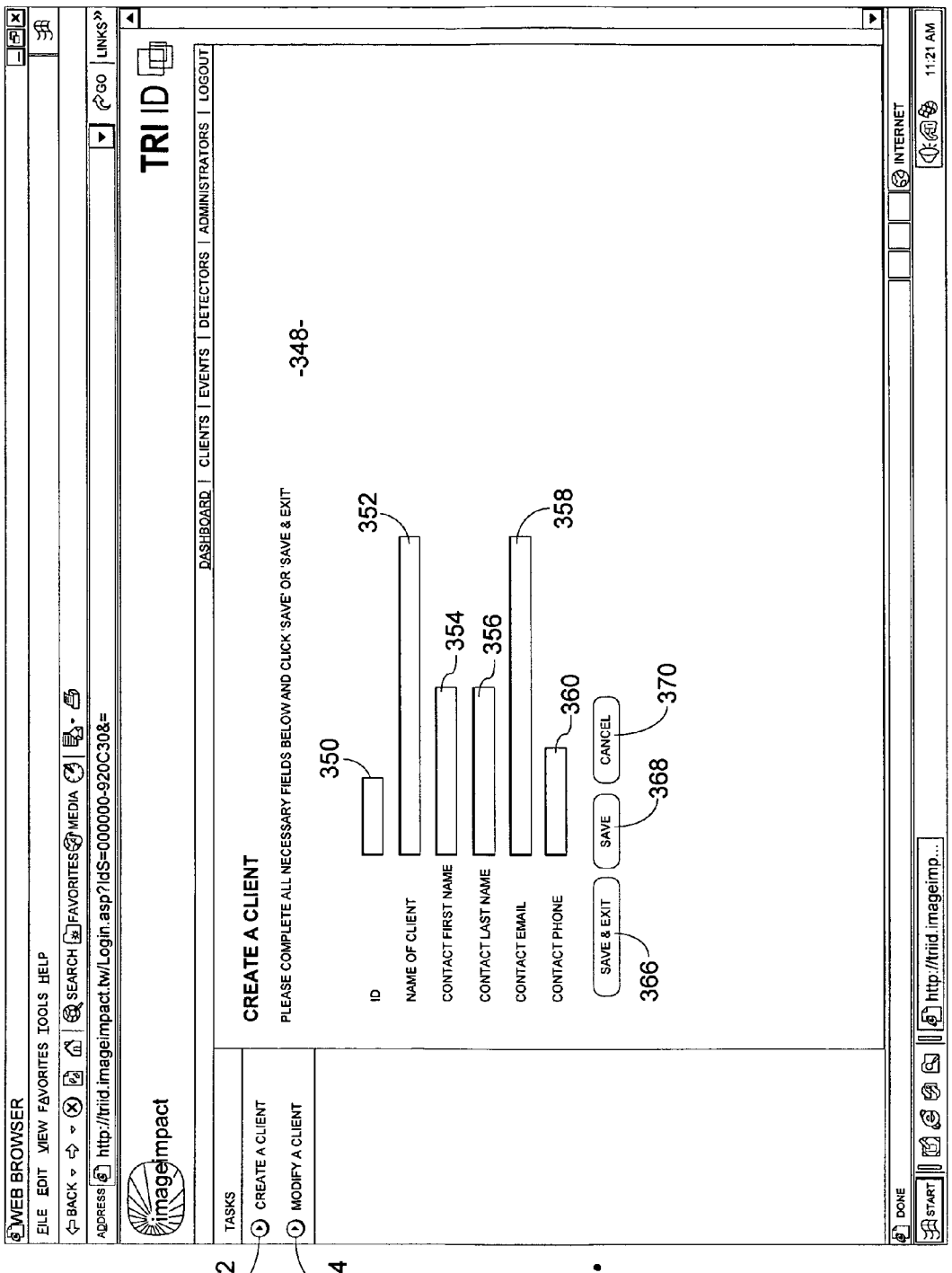
FIG. 5 depicts an illustrative screen interface for allowing an administrator to create a profile with a unique ID in accordance with an embodiment of the present invention.

At a step 210A, a client is created. With reference to FIG. 5, a screen shot 348 depicting a user interface for creating a client is provided according to an embodiment of the present invention. A unique ID can be automatically generated by the system, or provided by administrator 138 in box 350. Box 352 receives an entry for a name to be associated with a given client. Contact information can also be provided in first-name box 354, last-name box 356, e-mail box 358, and contact-phone box 360. Buttons are provided to either create a client 362 or to modify an existing client 364. Buttons can be also provided to efficiently save and exit, save, or cancel using respective buttons 366, 368, and 370. An exemplary name of a client may be "ESPN" or "MasterCard" for example.

Figure 6:
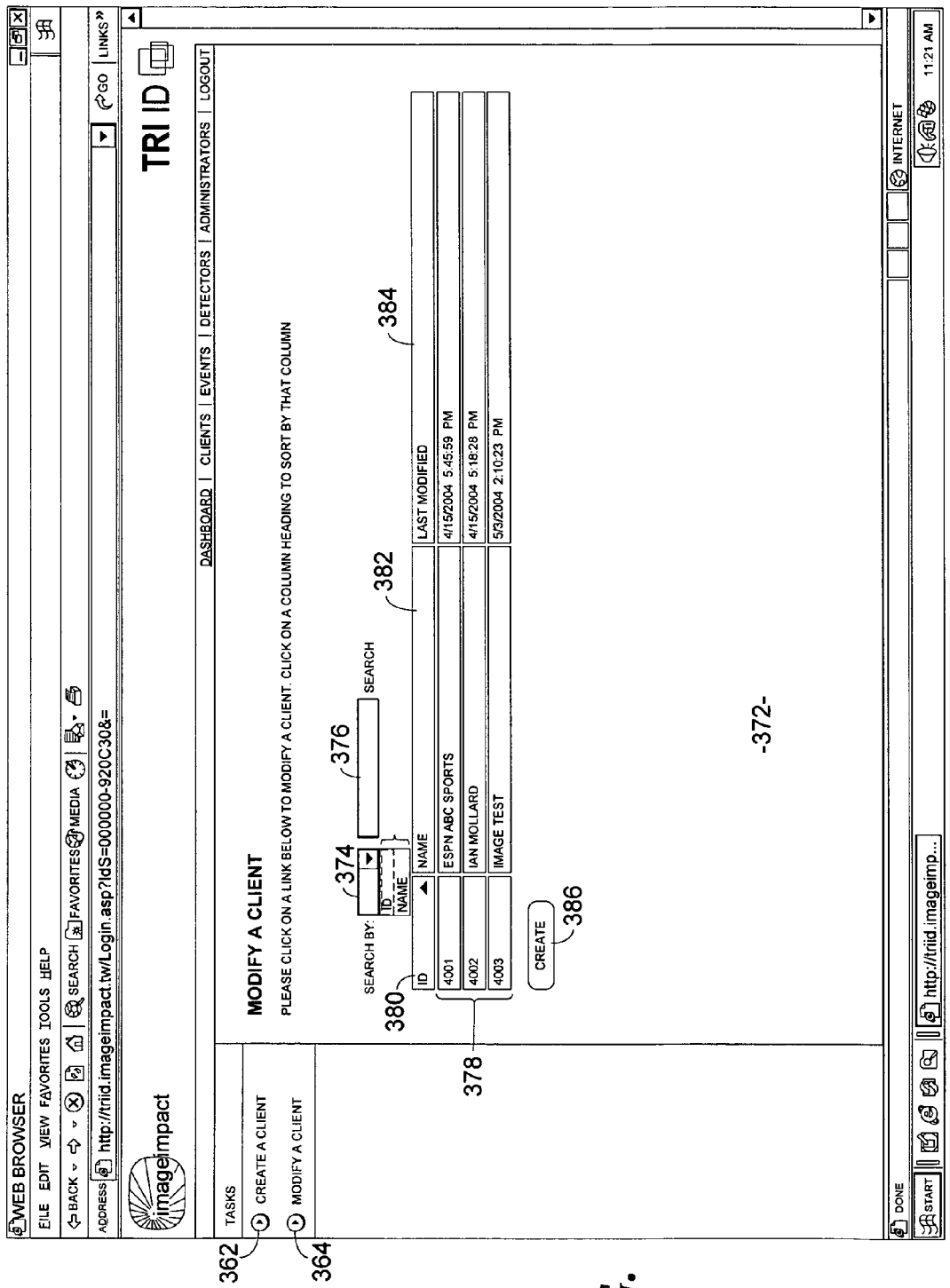
FIG. 6 depicts an illustrative interface for modifying information associated with a client in accordance with an embodiment of the present invention.

If the details associated with a client need to be modified, then administrator 138 can follow button 364 to be presented with screen 372, which is depicted in FIG. 6. Screenshot 372 includes a first drop-down menu 374 and a search box 376 to facilitate easy searching by administrator 138. A table of data 378 includes data associated with a client-ID column 380, a client-name column 382, and a last-modified column 384. The present invention also enables administrator 138 to sort the data in table 378 by clicking on the respective column heading. A new client may also be created by clicking an alternative create button 386.

Returning to FIG. 2A, an event is created at step 210B. The steps in FIG. 2A need not be carried out in any particular order. One could as easily create detectors before an event for example. Creating an event at step 210B, involves a set of sub-steps that also do not need to be carried out in the particular order shown, but are assigned reference numerals for the sake of clarity.

Figure 7:
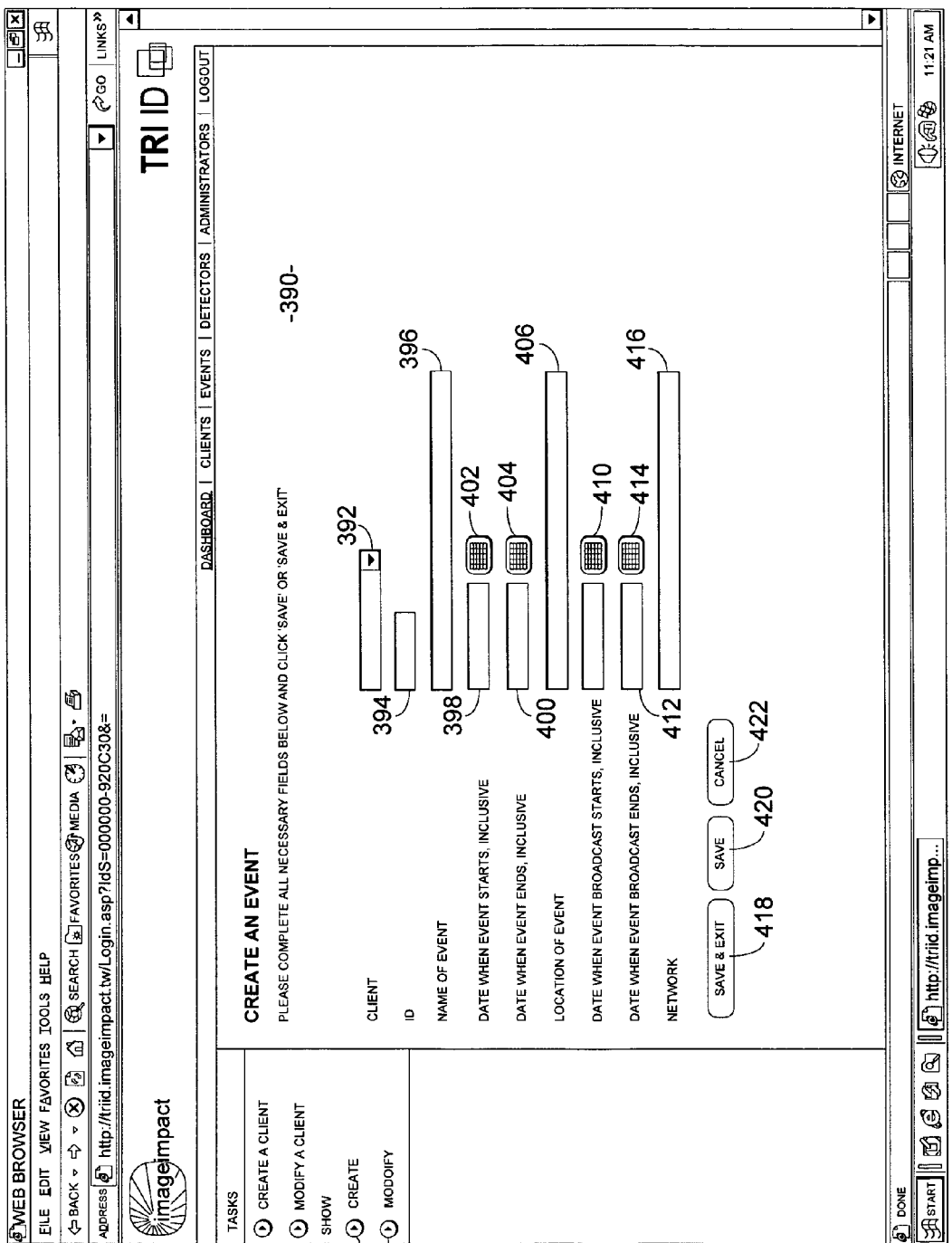
FIG. 7 depicts an illustrative interface for creating an event in accordance with an embodiment of the present invention.

Turning now to FIG. 7, a user interface 390 is depicted for creating an event. In one embodiment, each event is associated with a client, such as the one created in step 210A. This client is preferably selected by a dropdown box 392. An event ID can be generated automatically or provided by administrator 138 in ID box 394. The name of an event is received via input box 396. Dates associated with an event are inputted in boxes 398 and 400 with the aid of respective calendar buttons 402 and 404 that help ensure accuracy and reduce the likelihood of inadvertent errors. The location of an event is provided in one embodiment and received via input through box 406. Airing and broadcast information can be inputted with the aid of calendar button 410. The date when the event broadcast is slated to end can be in-putted in box 412 with the aid of still another calendar button 414.

An array of additional information not shown can also be created and associated with an event as one skilled in the art would readily appreciate. For example, the network associated with airing the event can be inputted via textbox 416. If an administrator wished to provide information associated with other event attributes such as the size of the event, the primary language to be spoken at the event, and the like, that could be done as easily as providing the information illustratively depicted.

The illustrative screen shots of the various user interfaces of the present invention, including user interface 390, are exemplary in nature and none of them should be construed as a limitation of the present invention. Rather, each is provided for referential purposes and to illustrate one embodiment of the present invention. Administrator 138 may save and exit work by pressing button 418, merely save work by pressing button 420, or cancel the entries made by using button 422. Although the creation of shows will be discussed below, a "create show" button 424 is provided along with a "modify show" button 426.

Assume for exemplary purposes that an event entitled "Winter X Games VIII" is to be created.

Figure 8:
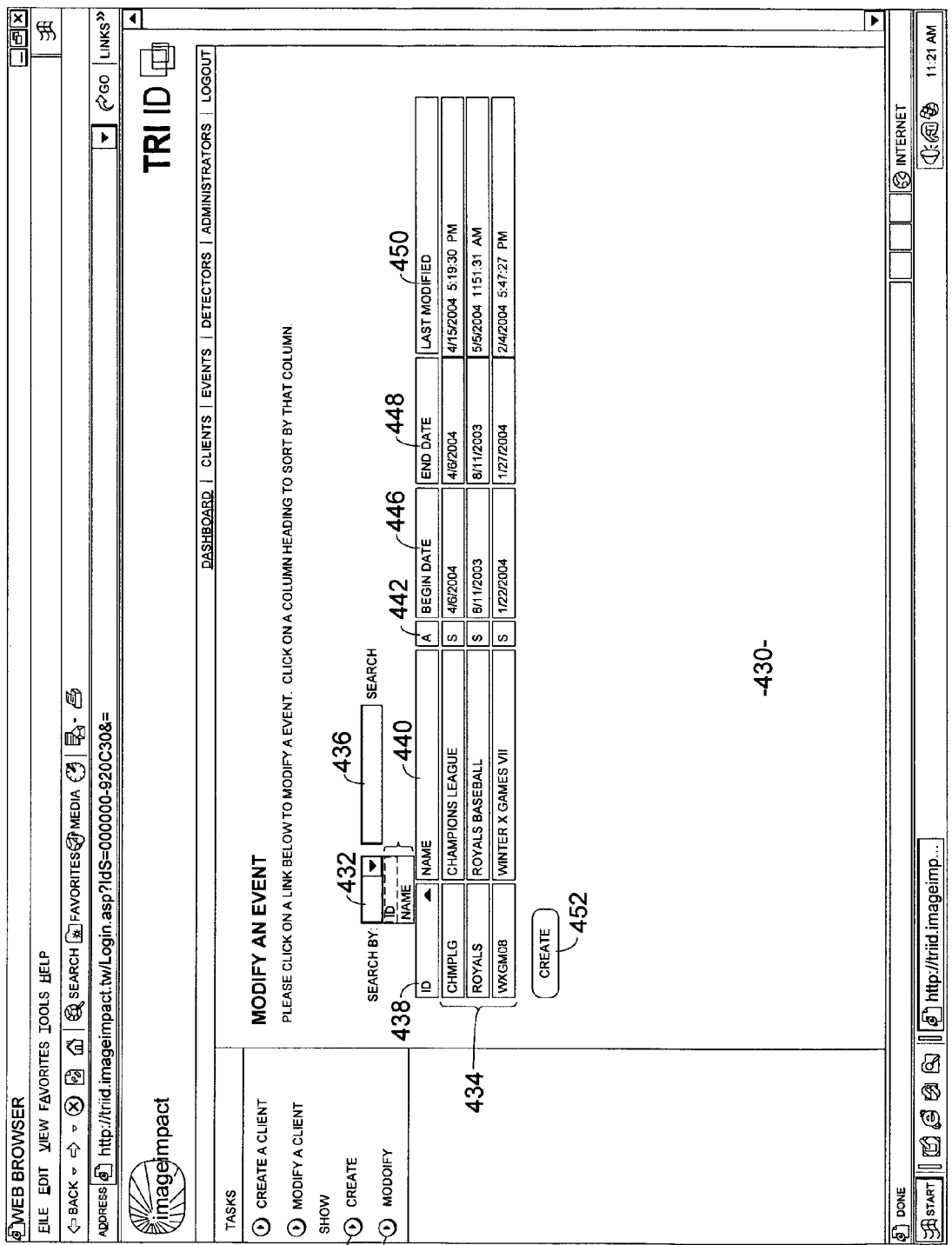
FIG. 8 depicts a first interface for modifying an event that displays an overview of events available in accordance with an embodiment of the present invention.

If administrator 138 desires to modify an event, then the present invention presents a user interface 430, illustratively depicted in FIG. 8, to provide such functionality. Drop-down box 432, allows administrator 138 to select search criteria to filter a list of events 434. Search criteria may also be entered via text box 436. Illustrative event listing 434 includes an event-ID column 438, an event-name column 440, an illustrative attributes column 442, a begin-date column 446, an end-date column 448, and a last-modified column 450. These events are preferably hyperlinked so that clicking on one or more of the records in event list 434 will bring up details associated with the event that can be modified. Additional events may be created by selecting create button 452. Assume for purposes of this example, that administrator 138 wishes to modify the attributes associated with the "Winter X Games VIII" event.

Figure 9:
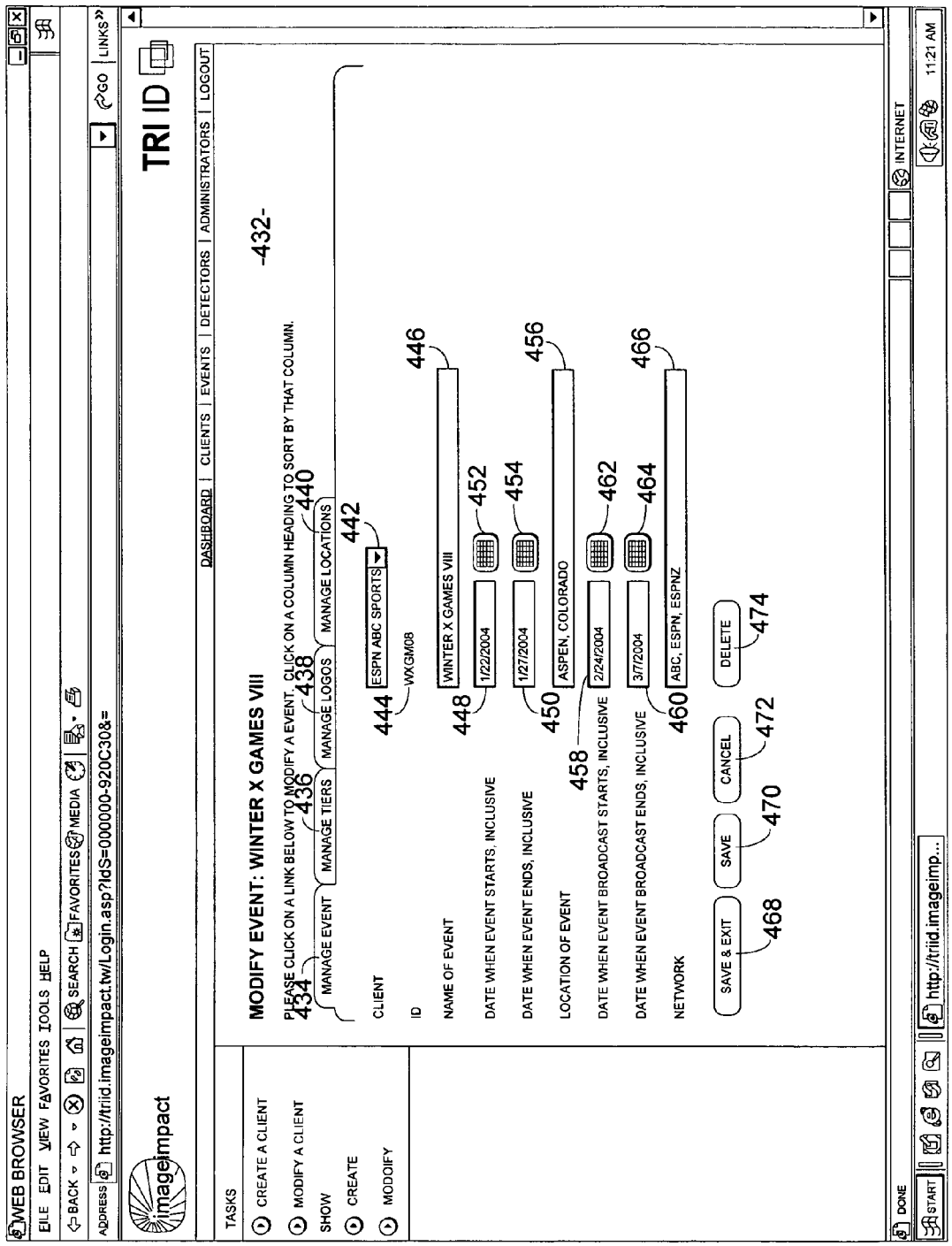
FIG. 9 depicts a second user interface associated with modifying an event that allows an administrator to view general information and enter specific information about an event.

Clicking on the event ID ("WXGM08" in this example) would be present user interface 432, which is illustratively depicted in FIG. 9. User interface 432 includes a "manage event" tab 434, a "manage tiers" tab 436, a "manage logos" tab 438, and a manage-locations tab 440. An ordinary skilled artisan will readily appreciate that additional tabs for other data organizers could also be included in user interface 432. Tabs 434-440 are shown for illustrative purposes according to one embodiment of the present invention.

Illustrative controls that offer exemplary functional aspects are depicted on managed-event tab 434. Having received a selection of the "Winter X Games VIII" event to modify, the present invention presents a client associated with that event by automatically populating a dropdown box 442. The ID of the client 444 is also preferably shown so that administrator 138 is aware of the event being modified or populated.

The name of the event is depicted in a text box 446. The date that an event starts and ends can be modified by manipulating the contents of textboxes 448 and/or 450. Two calendar buttons 452 and 454 are provided to reduce the likelihood of inadvertent errors occurring with respect to entry of dates. The location of the event can be changed by manipulating the data in box 456. Similarly, the dates associated with when the event broadcast is to start and end can be varied by manipulating the data in textboxes 458 and 460, preferably using calendar buttons 462 and/or 464. The broadcast network associated with the event may also be changed using textbox 466. Buttons to save and exit, save, cancel, and even delete are shown by reference numerals 468, 470, 472, and 474.

At step 210D, tiers can be created and managed according to an embodiment of the present invention. As used herein, a "tier" refers to a sponsorship level. For example, an event may consist of three sponsorship tiers, such as a first tier, a second tier, and a third tier; or a platinum-level sponsor, a gold-level sponsor and a silver-level sponsor. The ability to define tiers provides an illustrative example of the amount and different types of data that can be gathered and associated with individual advertising-image occurrences, to be subsequently used for data analysis. The ability to allocate an attribute, such as a tier, to various sponsors of an event is an illustrative improvement over the prior art.

Figure 10:
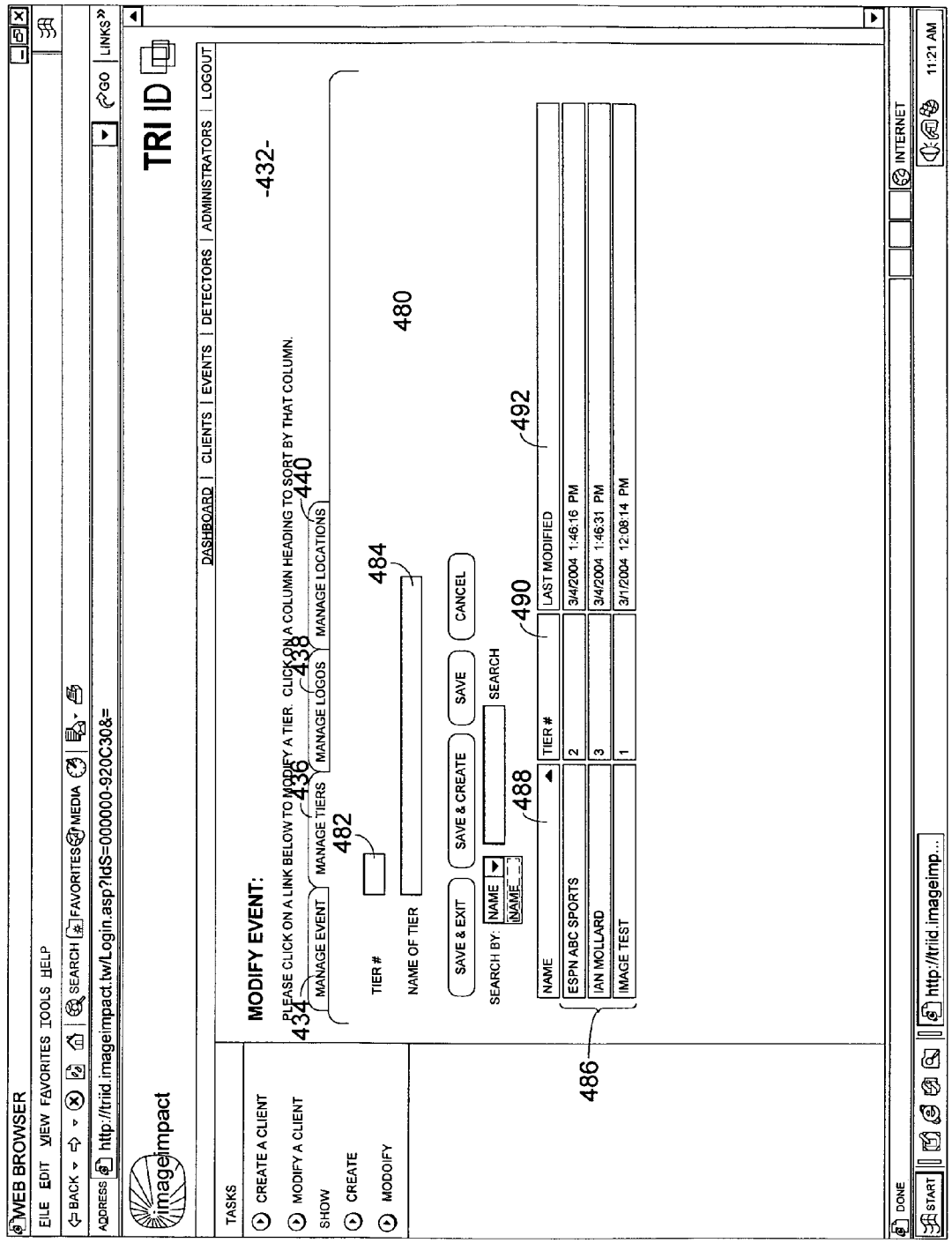
FIG. 10 depicts a third illustrative interface for modifying an event and allowing an administrator to create sponsor peers and to categorize sponsors within an event in accordance with an embodiment with the present invention.

As depicted in FIG. 10, user interface subsection 480 provides administrator 138 with controls to populate attributes associated with a given tier. For instance, a tier number can be inputted into a textbox 482. The tier can be named by entering data into textbox 484. Familiar save and exit buttons are present on user interface 480. User interface 480 also provides the ability to display a list of tiers 486 that includes a name column 488, a tier-number column 490, and a last-modified column 492. The tier-description list 486 presents to administrator 138 a summary of the various tiers associated with a given event, which in this example is the Winter X Games VIII. Returning to FIG. 2A, logos can be created and managed at a step 210E, which will be explained with reference to FIG. 11.

Figure 11:
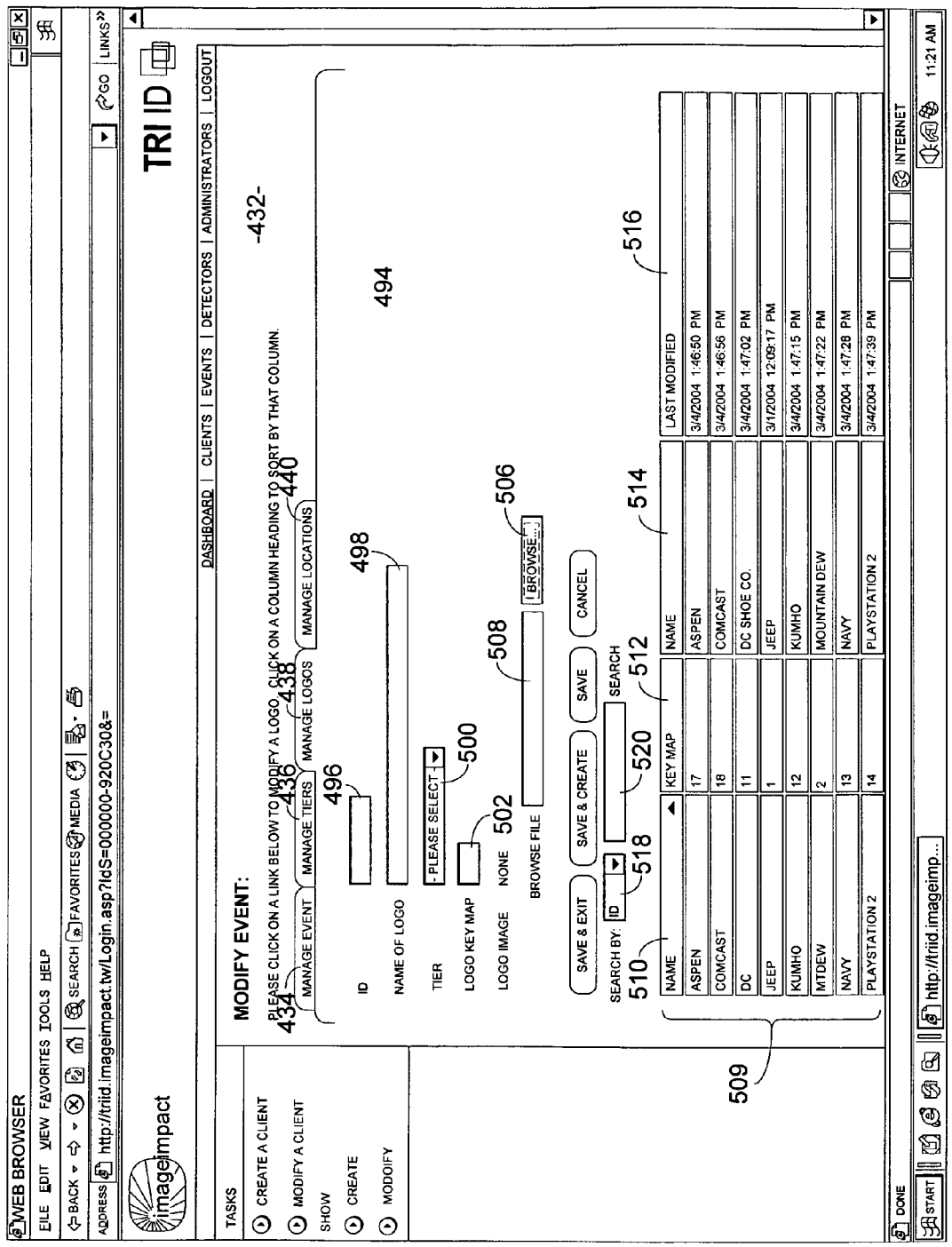
FIG. 11 depicts a fourth illustrative screen shot for modifying an event that allows an administrator to manage logos associated with an event in accordance with an embodiment with the present invention.

FIG. 11 depicts the user interface subsection 494 that is used to configure logos of various advertisers or other entities associated with a given event. Providing the logo attributes at this stage will make for extremely quick and efficient entry of data associated with the logos during the detection process 230. A skilled artisan will appreciate that the illustrative methodologies described herein can be employed to designate virtually any type of attribute to ultimately be associated with a logo or data image. Exemplary attributes are shown in FIG. 11.

An attribute ID can be generated automatically or provided by administrator 138 using textbox 496. The logo can be named using textbox 498. A tier associated with the logo can be provided by making a selection from dropdown menu 500. For example, "Tostitos" may be a presenting sponsor of a game held at the Tostitos Bowl, and thereby associated with a "Tier 1" designation.

A logo key map can be inputted via a textbox 502. A logo key map is a key sequence that will be used to enter the logo during detection process 210C. A logo key map of "17" for example may be associated with a particular frame by merely typing in the number "17." A logo image can be provided and identified by control 504. The image can be selected using a browse button 506, or its path can be manually entered into a textbox 508. Familiar save, exit, and cancel buttons are also provided on user interface 494. A logo listing 509 is provided in one embodiment to enable administrator to read the various attributes that have been assigned or associated with various logos. A name column 510, key map column 512, name column 514, and last-modified column 516 are illustrative columns depicted according to an embodiment of the present invention. The data in list 509 can be searched according to a dropdown menu 518 or by data entered into a search box 520.

Figure 12:
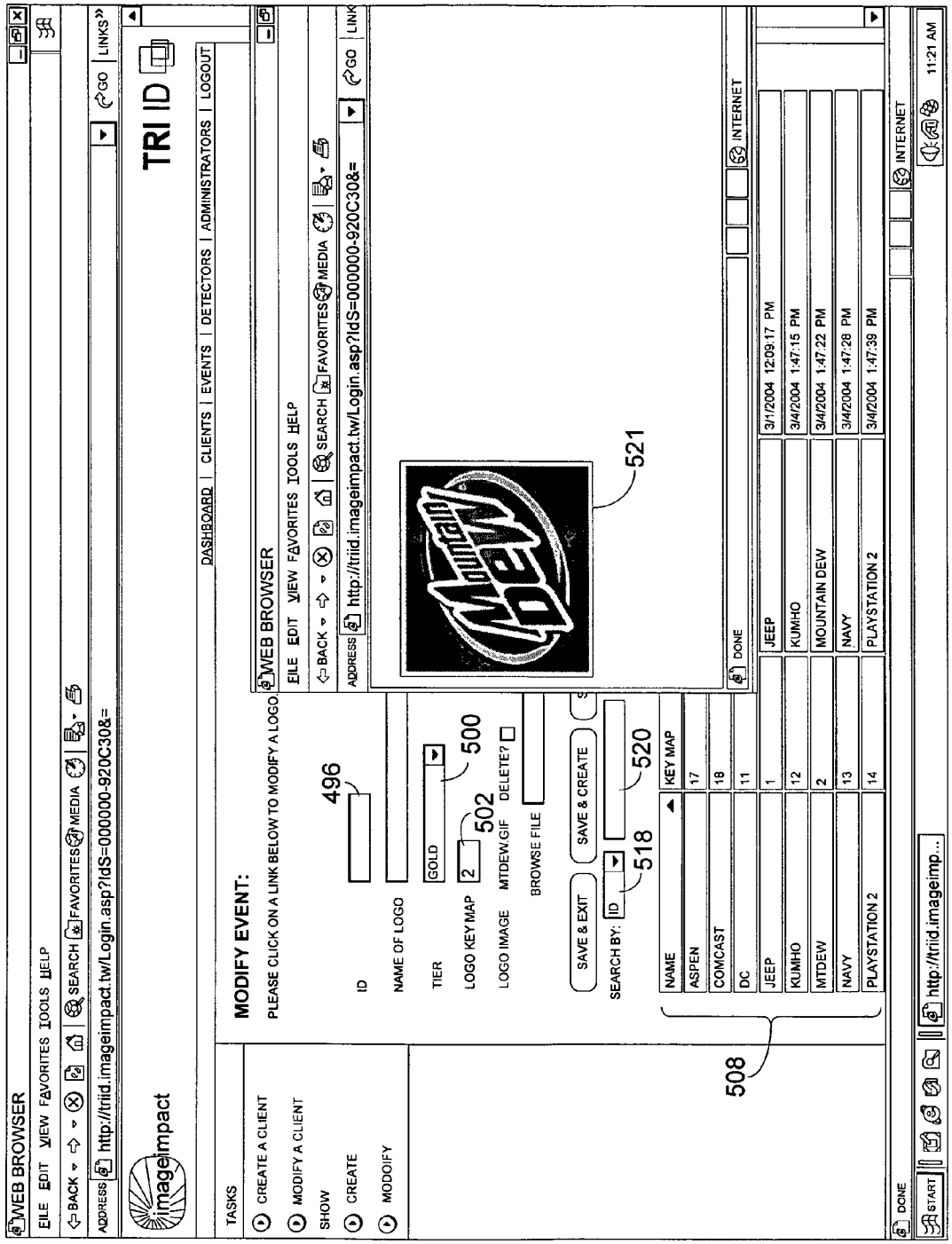
FIG. 12 depicts a fifth illustrative interface for viewing categorized peers and associating a logo key map with a key sequence in accordance with an embodiment of the present invention.

As previously mentioned, additional logo attributes can also be entered at this stage. For instance, as previously mentioned, an image that corresponds to the logo of interest can be uploaded and associated with a particular logo. During detection process 210C, the presence of the logo picture will make possible detection by a person who is not familiar with the logo. For instance, if somebody was unaware of the "Nike" logo, this would not be concern because a picture of the familiar swoosh would appear when the user types in the key map associated with the logo. The screen shot of FIG. 12 represents the illustrative retrieving of an exemplary image, here "Mountain Dew" image 521.

Figure 13:
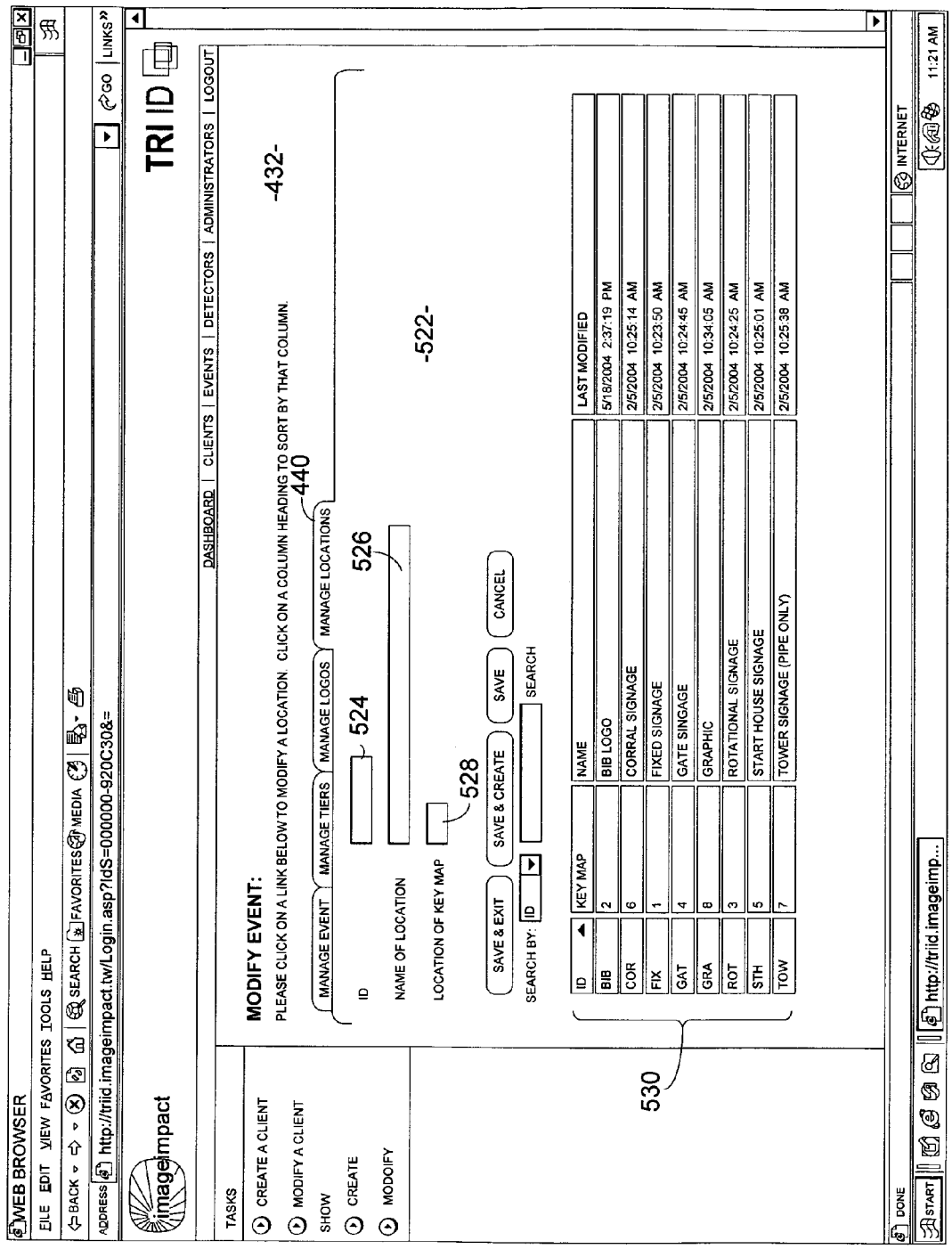
FIG. 13 depicts an illustrative interface for creating unique locations where signage and other advertisements may appear in accordance with an embodiment of the present invention.

Returning to FIG. 2A, locations are created and managed at a step 210F, which will be explained with reference to FIG. 13. FIG. 13 depicts a user interface portion 522 for managing locations. As used herein, "locations" refers to the location or source of an advertising image, such a wall, ball cap, car, starting gate, etc. An ID can be automatically generated or manually entered in a textbox 524. The name of a location may be entered via a textbox 526. The key map associated with a logo location may be inputted via textbox 528. Again, the key map 528 corresponds to a key sequence that, when entered during the detection process, will associate a specific source to an advertisement image.

As shown in a logo-location list 530, illustrative locations, or sources, also may include a bib logo, corral signage, fixed signage, gate signage, a graphic (which is often a computer animated image depicted on a viewer's viewing device), rotational signage, start house signage, or tower signage. Location options are limitless. The preceding eight examples of sources of advertisement images are illustrative in nature and should not be construed as a limitation of the present invention. Rather, administrator 138 may define as many locations as desired. Similarly, attributes in addition to an identifier, name, and key map may also be associated with a logo. One skilled in the art would appreciate that as many such attributes as desired could be included and configured in user interface 522.

Identifying logos and associating various attributes with those logos illustrates another improvement over the prior art offered by the present invention. Historically, the sources of advertisements images has not been able to easily be captured and associated with the identified images. But by predefining logos and attributes associated with those logos, the present invention offers a method whereby the logos will be able to be easily be associated with advertising images during the detection process. This methodology can be extrapolated to include any information that is desired to be tracked, all the way down to logo versions, colors, anything.

Figure 14:
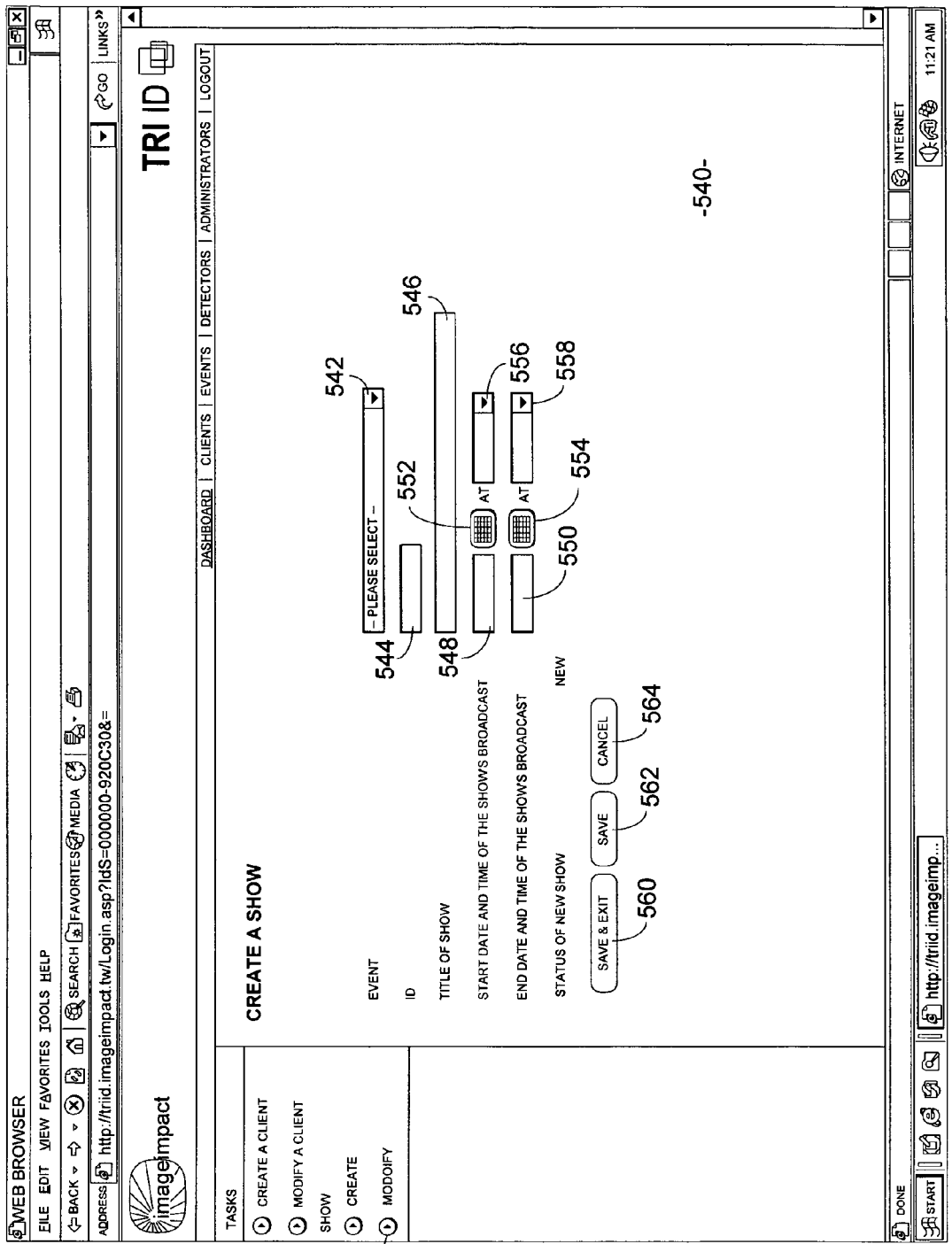
FIG. 14 depicts an illustrative interface for defining show segments.

Briefly returning to FIG. 2A, shows are created and managed at a stop 210G. The creation of a show will be illustrated beginning at FIG. 14, which depicts a user interface 540 for receiving data associated with creating a show. As used herein, a "show" is a portion of an event, or the event itself if the event is not subdivided. A show may be the second game of a world series. Alternatively, a show may be the first seven minutes of a single game of the World Series. Can of shows can also be defined and created. Any number of shows may be associated with an event preferably using a dropdown box 542. A show identifier can be generated or inputted into textbox 544. A title can be received via textbox 546, and dates associated with the show's airing can be inputted via boxes 548 and 550 as shown. Calendar buttons 552 and 554 can be used to populate boxes 548 and 550, and dropdown boxes 556 and 558 can be used to input times easily. Save and exit buttons 560, 562, and 564 provide functionality as shown.

Figure 15:
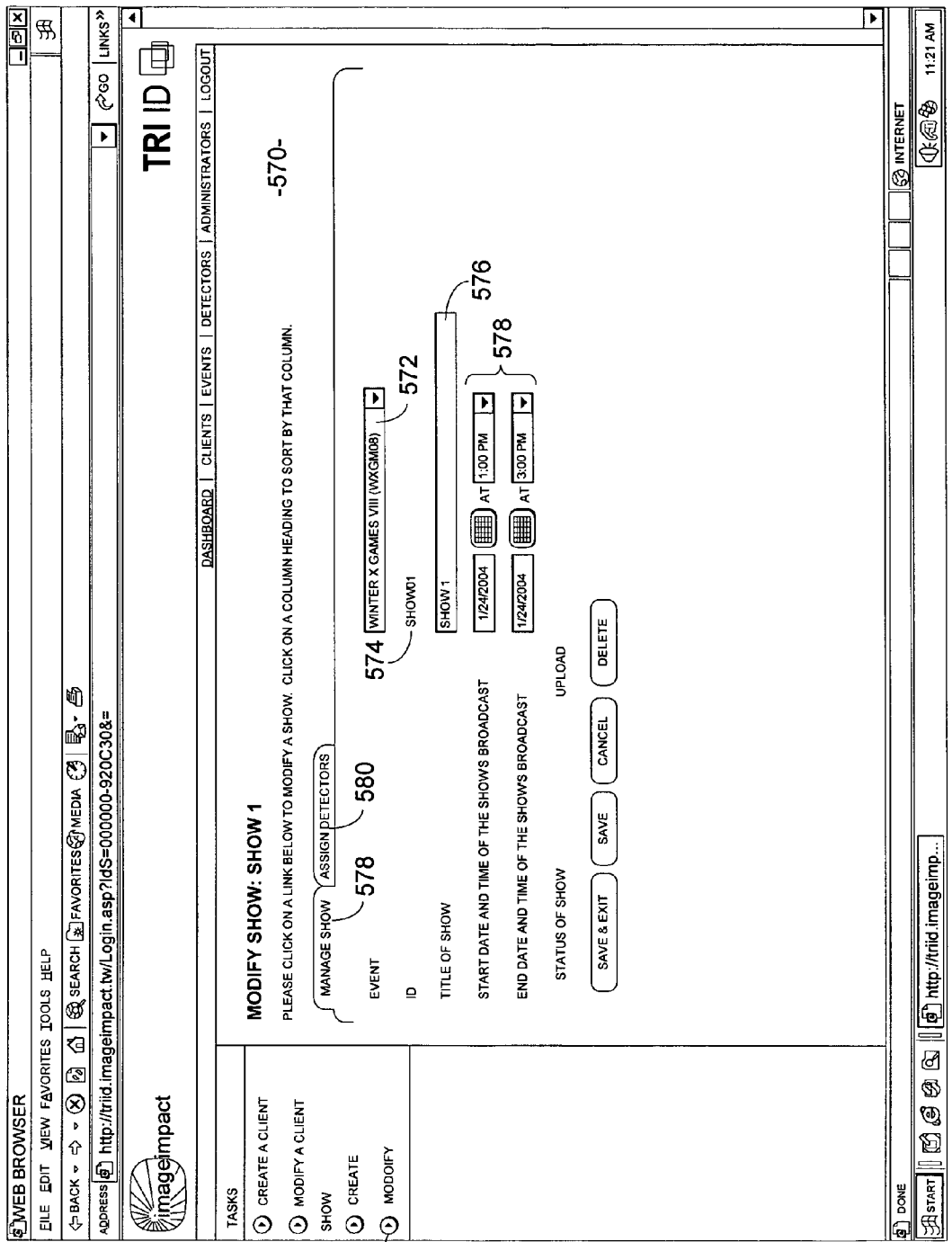
FIG. 15 depicts an illustrative interface for managing show information in accordance with an embodiment of the present invention.

To modify a show, administrator 138 can click "modify" button 426 to be presented with a user interface 570, which is depicted in FIG. 15. Shows can be modified to change the event with which they are associated via dropdown box 572. A show identifier 574 is presented for easy reference. The title of a show may be varied by manipulating the data in textbox 576. And dates and times can be changed by varying the data using date-selection controls 577 as shown. Two tabs are depicted in user interface 570: a "manage show" tab 578 and an "assign detectors" tab 580.

Figure 16:
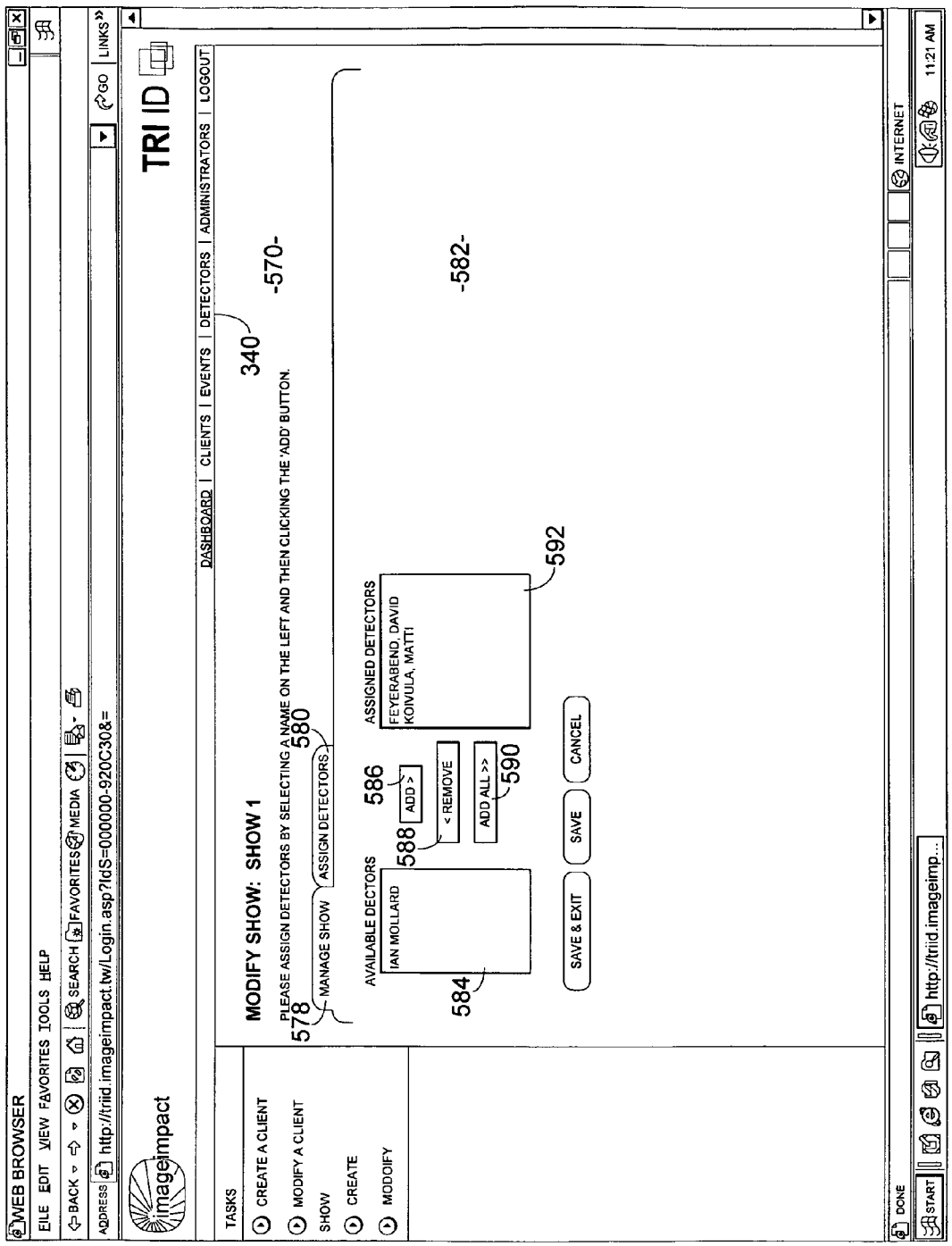
FIG. 16 depicts an illustrative interface for assigning a show to one or more detectors for evaluation.

Detectors can be assigned by clicking on tab 580, which will present user interface subsection 582 (see FIG. 16). As used herein, "detector" refers to the entity that determines the presence of an advertisement image. In one embodiment, a detector is a human being. In this embodiment, image-recognition technology is not employed. Image-recognition technology employs a software program to determine if one image sample sufficiently matches another image sample.

A list of available detectors is presented in box 584. One or more of the available detectors may be assigned to detect advertisement images of a show by clicking the "add" button 586. Similarly, an assigned detector may be removed by highlighting that detector and clicking the "remove" button 588. If all of the available detectors are to be assigned to the given show, then they can be easily assigned by clicking the "add all" button 590. A listing of detectors assigned to the instant show is depicted in box 592. Attributes associated with detectors can be accessed by following link 340.

Figure 17:
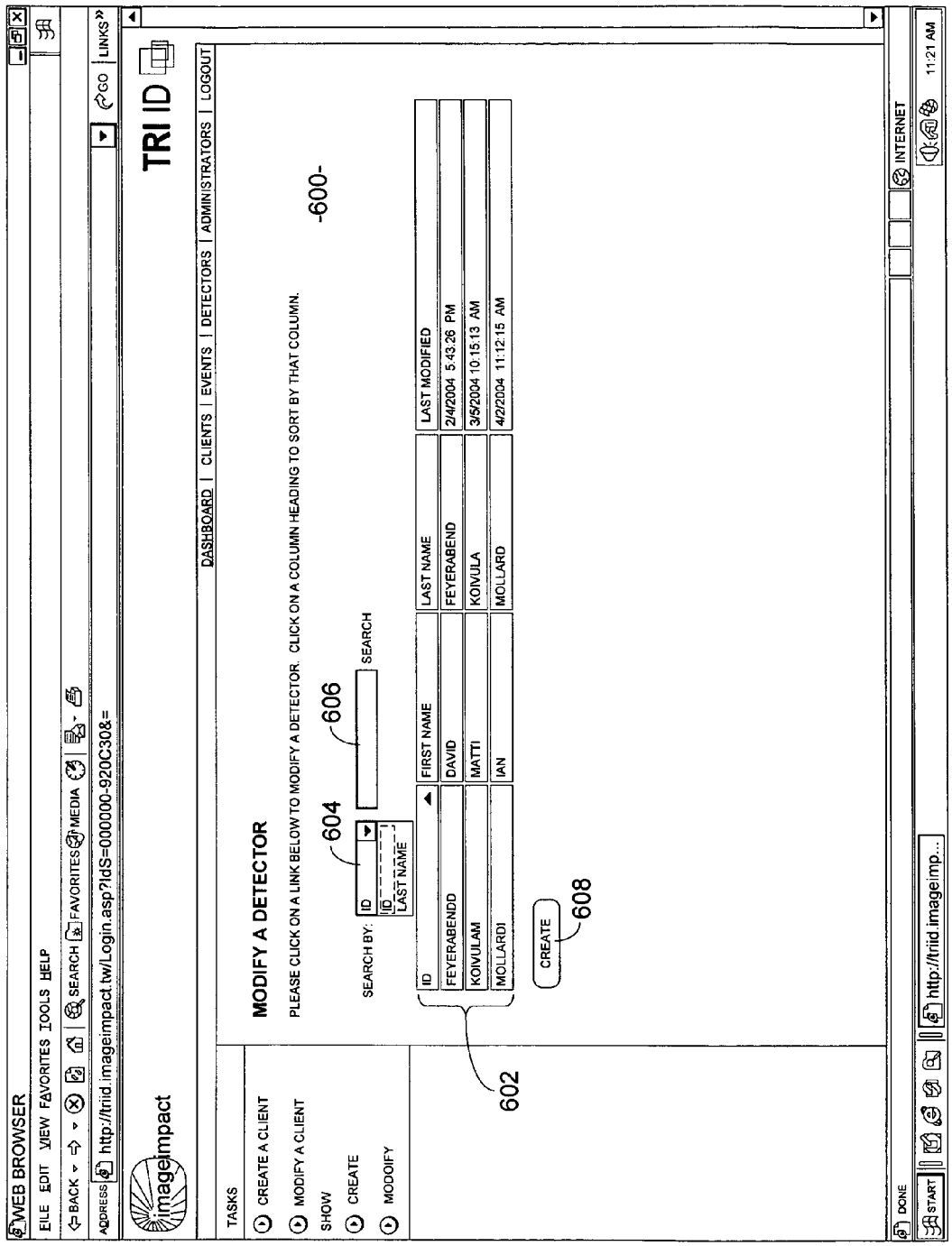
FIG. 17 depicts an illustrative interface for viewing and receiving information related to detectors in accordance with an embodiment of the present invention.

Following link 340 causes exemplary screenshot 600 (depicted in FIG. 17) to be presented. Screenshot 600 depicts a list 602 of detectors stored in the system. Detectors can be searched by using a drop-down box 604 or by entering search criteria into a text box 606. A new detector can be created by clicking on "create" button 608.

Figure 18:
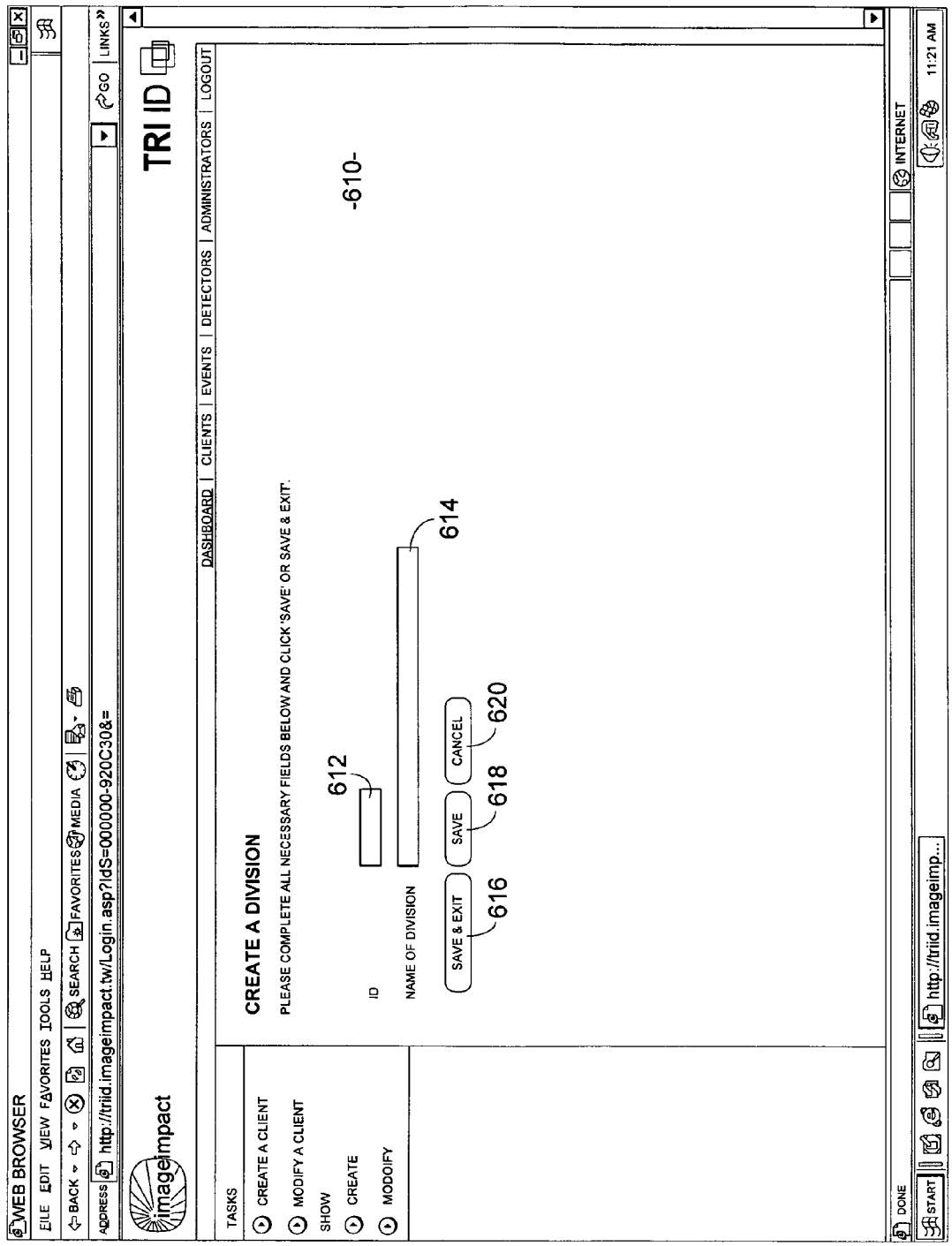
FIG. 18 depicts an illustrative interface to create divisions that can be used to categorize detectors in accordance with an embodiment of the present invention.

FIG. 18 illustrates a user interface 610 to group detectors according to divisions, which often means according to geographic regions. A division identifier can be inputted into a "ID" text box 612 and named via text box 614. Functional buttons 616, 618, and 620 allows administrator 138 to quickly save and exit changes, to merely save changes, or to cancel division creation. Additional details related to creating a new detector are provided with reference to FIG. 19.

Figure 19:
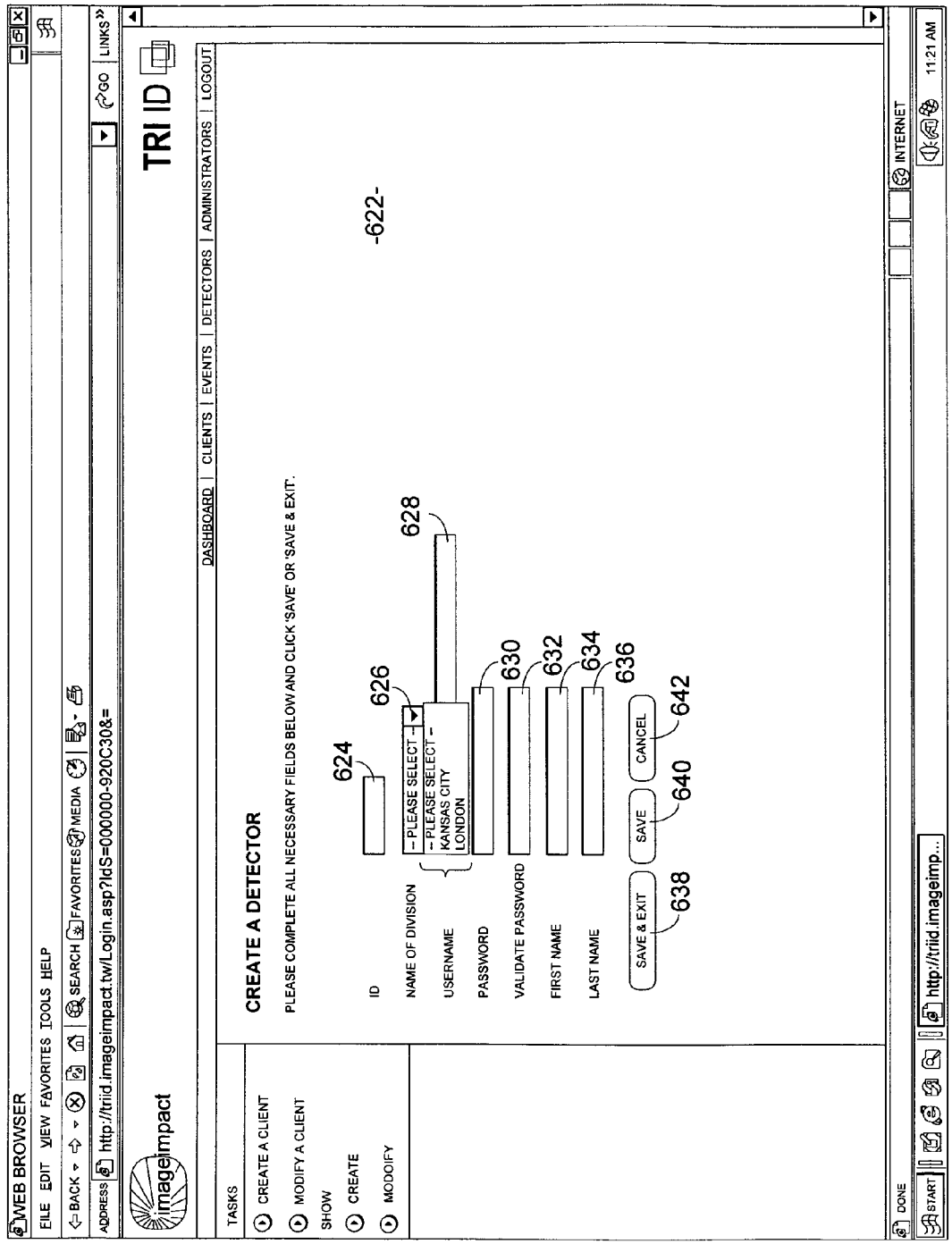
FIG. 19 depicts an illustrative interface for creating profiles associated with one or more detectors in accordance with an embodiment of the present invention.

FIG. 19 depicts a screenshot 622 that provides an illustrative user interface for creating a detector. An identifier that uniquely identifies a detector can be automatically generated or provided by administrator 138 using text box 624. A division can be associated with the detector by selecting one from drop-down menu 626. Security credentials can also be associated with the detector. In an preferred embodiment, the detector is assigned a user name and password via respective text boxes 628, 630, and 632. A detector's first and last name can be provided in text boxes 634 and 636. Familiar save and exit buttons 638-642 are also provided.

Returning now to FIG. 2, data ultimately to be analyzed is captured at a step 220. As previously indicated, the steps of FIG. 2 need not necessarily be carried out in the order shown. Rather, the steps depicted in FIG. 2 are shown for illustrative purposes, but can be performed in a different order. For instance, data can be captured before set-up functions are performed in step 210. Capturing data in one embodiment will be described in greater detail with reference to FIG. 2B and FIG. 1.

Figure 2C:
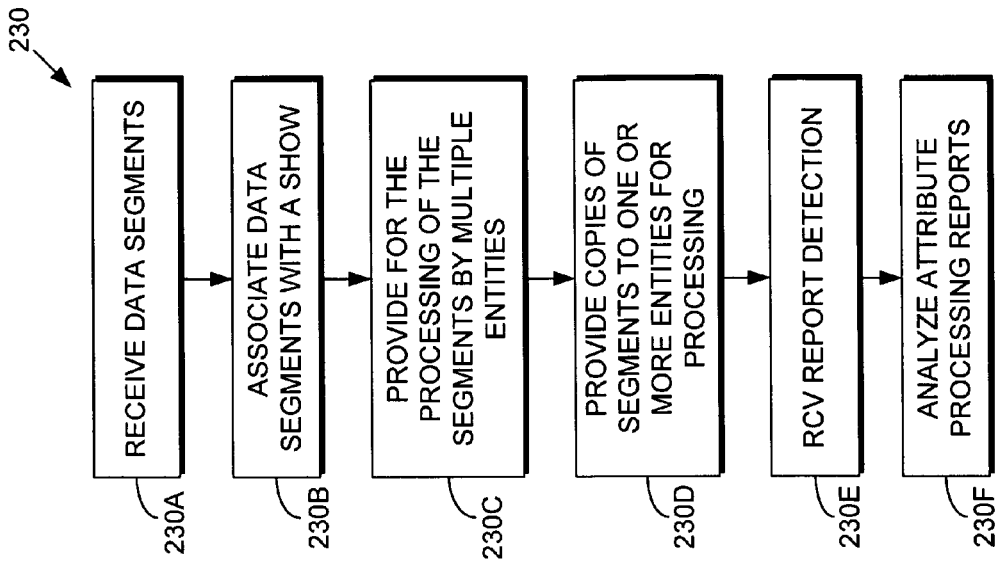
FIG. 2C is a flowchart depicting an exemplary method for detecting hits and associating attributes in accordance with an embodiment of the present invention.
Figure 2B:
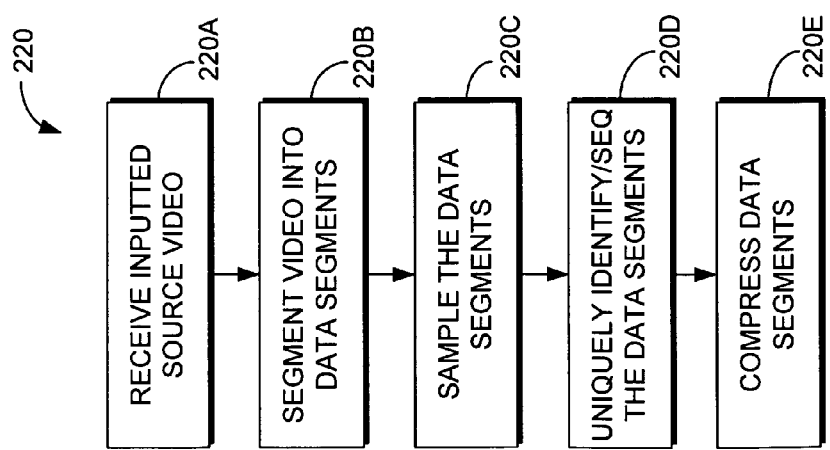
FIG. 2B is a flowchart depicting an exemplary method for capturing data in accordance with an embodiment of the present invention.

Turning now to FIG. 2B, source video is received at a step 220A. Source video is preferably native footage 110. Native footage 110, as previously mentioned, is footage or a video source that exists in its native format. Exemplary native footage includes a live feed, a VHS recording, a DVD recording, streaming video etc. In one embodiment, native footage 110 is received by video-capture component 112. At a step 220B, native footage 110 is segmented into a set of data segments. These data segments will also be referred to as "frames." The frames are generated by segmenting component 114. Exemplary hardware that helps facilitate video capturing and segmenting suitable for use in the present invention is offered by Avid Technology, Inc. of Tewksbury, Mass.; but one of ordinary skill in the art will appreciate other hardware devices that could also be used.

The data segments are then sampled at a step 220C. Based on the fidelity of native footage 110, a certain number of data segments will be selected from the set of all data segments. For instance, if needed footage 110 exists in 30-FPS (frames per second) format, then 30 data segments will correspond to one second of video. In one embodiment, a select number of frames is chosen to be examined, thereby reducing the amount of data that needs to be managed. For example, three frames can be sampled at step 220C. Assuming the data in frame 1 is present in the first sampled frame, each frame represents about one third of a second. In this embodiment, three contiguous frames would correspond to one second. In an alternative embodiment, five out of thirty frames could be sampled to provide a greater level of granularity. In this case, three contiguous frames would correspond to 0.6 seconds. For exemplary purposes, the explanation will continue assuming a sampling rate of every ten frames for simplicity and so as not to obscure the present invention.

By sampling the frames in this manner, the present invention offers the ability to definitively know the duration that a given image persists on the screen. An image present in three frames would be presented over the span of one second of native footage 110. Partitioning native footage 110 into a set of frames 126 allows each frame to be examined carefully. By sampling frames, the process can be completed quickly without sacrificing accuracy.

At a step 220D, each frame is uniquely identified and sequenced. With forethought in mind, the name of each frame is preferably indicative of the respective event and/or show to which the frames 126 correspond. At a step 220E, the frames are compressed according to a compression algorithm to further reduce the size of data that needs to be managed. In one embodiment, the frames are compressed according to the JPEG compression scheme to a fraction of their original filesize. This scheme will maintain a high level of fidelity in the compressed format. Returning now to FIG. 2, hits are detected and attributes are associated with those hits at a step 230, which will be described with reference to FIG. 2C and corresponding screenshots.

Turning now to FIG. 2C, an exemplary process for detecting hits and associated attributes with those hits is provided according to an embodiment of the present invention and referenced generally by the numeral 230. Various screen shots and other diagrams will also be referenced in connection with FIG. 2C to provide a greater understanding of detecting hits and assign attributes to those hits. At a step 230A, the data segments of step 220 are received. In one embodiment, the data segments are received by server 118. The data segments are then associated with a show at a step 230B. Step 230C represents processing of segments by multiple entities. This process can be explained in greater detail beginning with FIG. 20.

Figure 20:
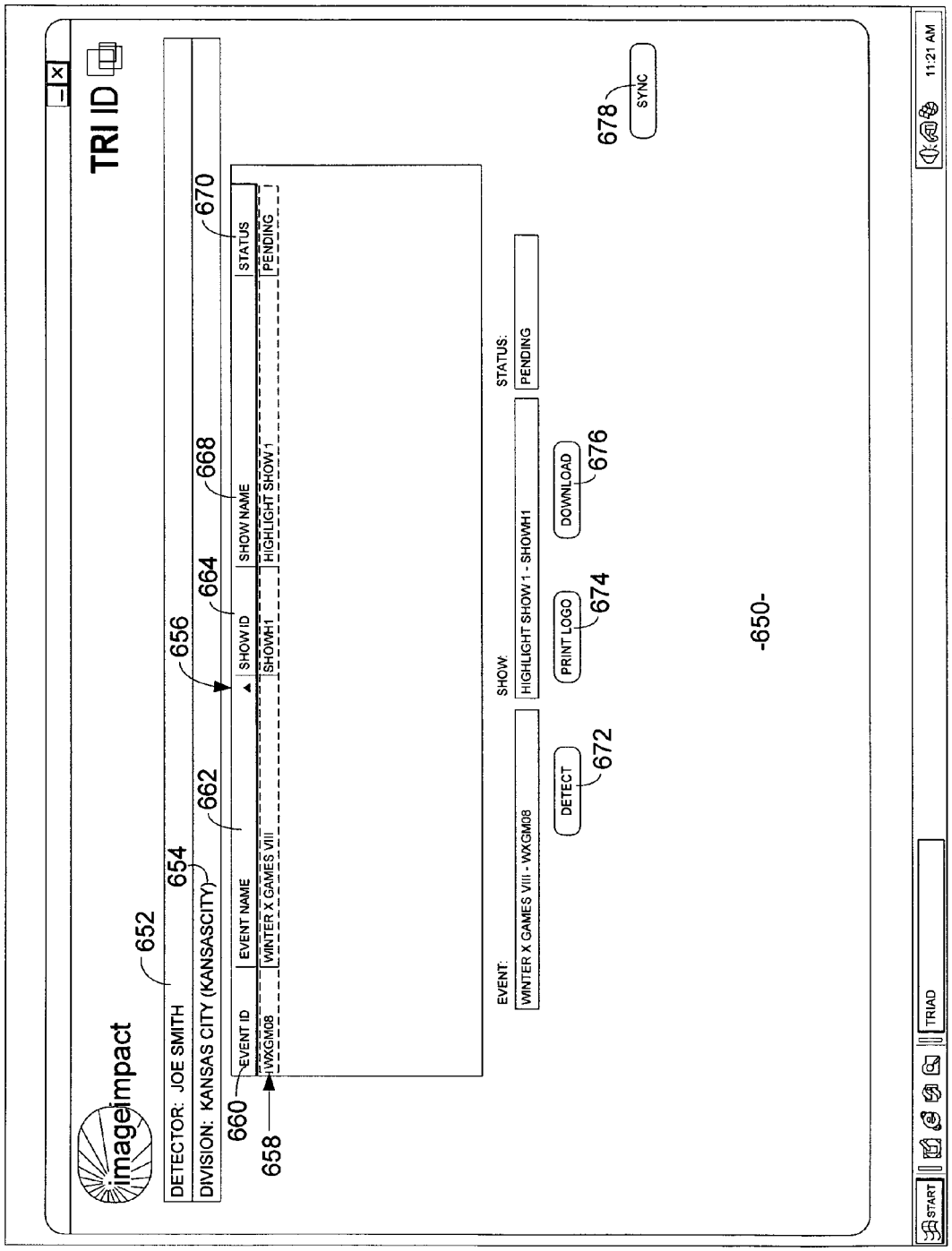
FIGS. 20-22 depict an illustrative interface associated with detection application 130 for retrieving and viewing shows to be detected in accordance with an embodiment of the present invention.

FIG. 20 depicts an illustrative screenshot 650 of a user interface for a detector to log in and access frames 126. With brief reference to FIG. 1, it can be seen that frames 126 will ultimately be downloaded or accessed from server 118 to a detection site 128. Detection site 128 will preferably include detection application 130, which in one embodiment is represented in FIGS. 20-26.

Returning now to FIG. 20, user interface 650 includes a name indicator 652 that identifies a specific detector, who preferably accesses user interface 650 incident to providing a set of security credentials, such as a user name and password. The division 654 is also indicated. Screenshot 650 includes a table 656 that lists jobs that have been assigned to the detector 652. As shown by row 658, the event "Winter X games VIII" is available for detection.

Table 656 preferable includes an event-ID column 660, an event-name column 662, a show-ID column 664, a show-name column 668, and a status column 670. From this screen 650, a user can select a row, such as row 658, and choose to begin detecting advertising images by clicking on the "detect" button 672. An option to print a corresponding logo can be exposed by clicking print-logo button 674. A user may download frames 126 corresponding to the event 658 by clicking download button 676. A synchronization function is also offered by clicking button 678 whereby detection site 128 can be synchronized to server 118.

Figure 21:
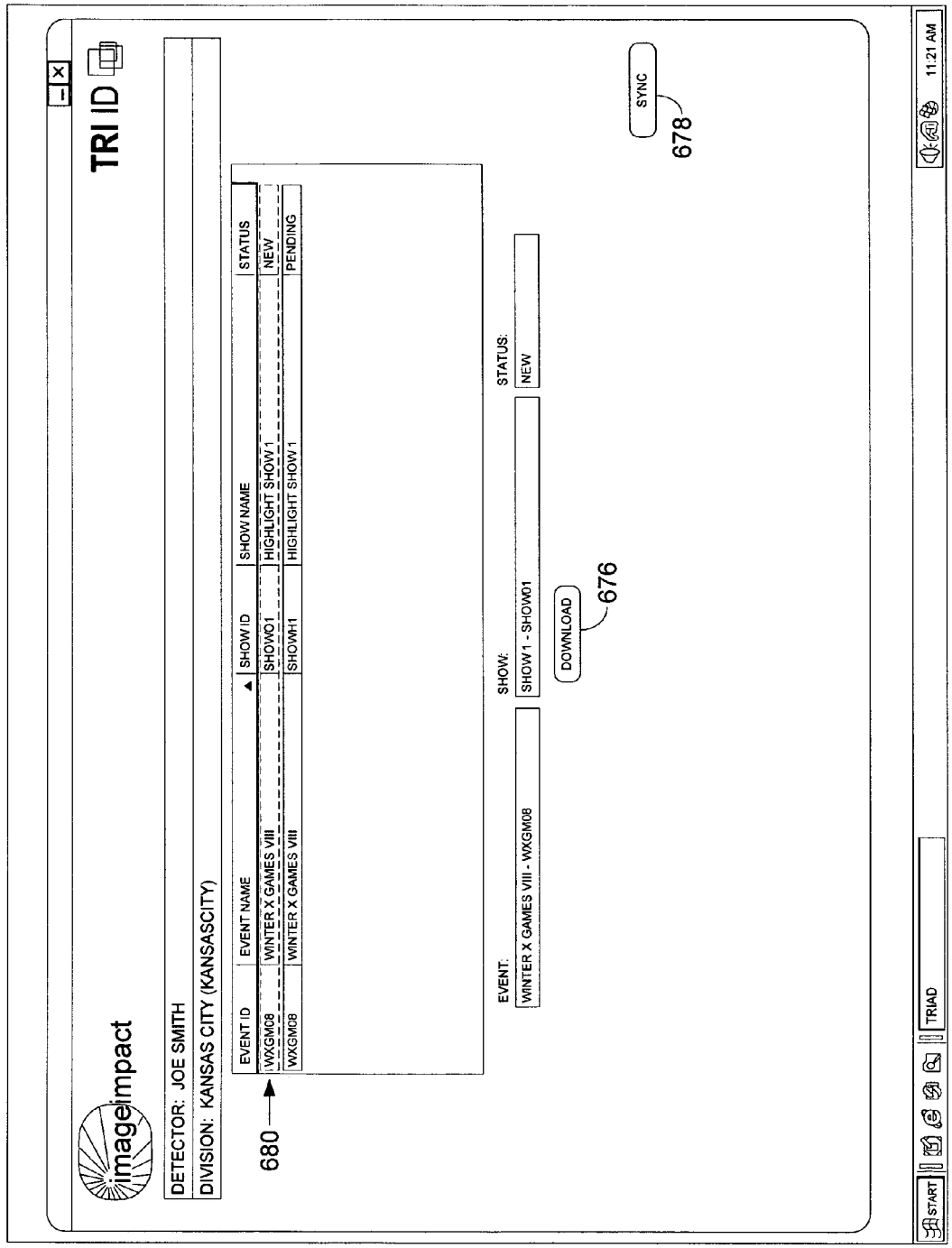

FIG. 21 represents another record 680 which is shown as having a "new" status. Because record 680 is new, only an option to download details associated with that record are provided in the preferred embodiment. But a detector may still synchronize with server 118 by selecting button 678. Downloading frames 126 is one way to provide copies of the segments to the one or more entities for processing as indicated by step 230D in FIG. 2C.

Figure 22:
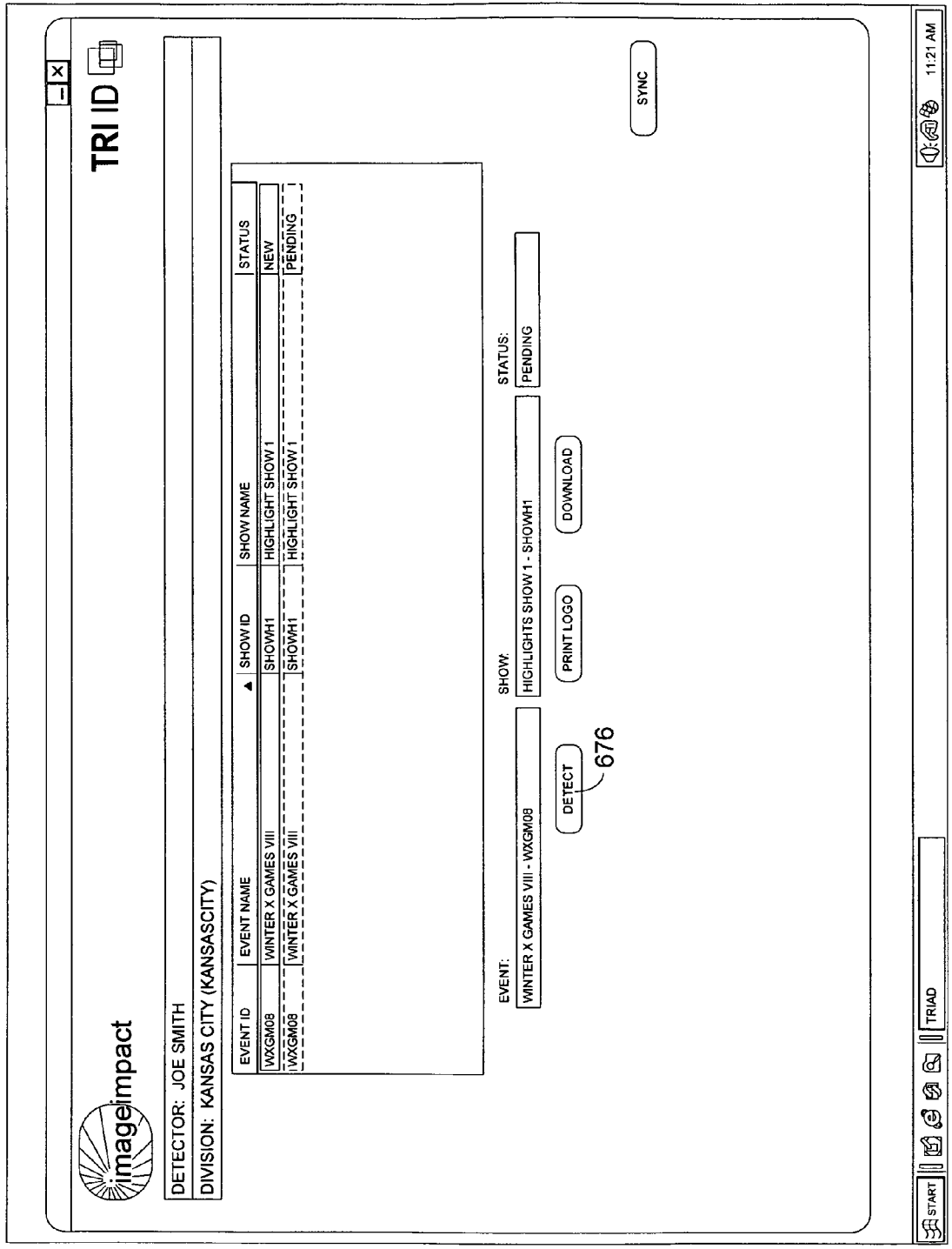
Figure 23:
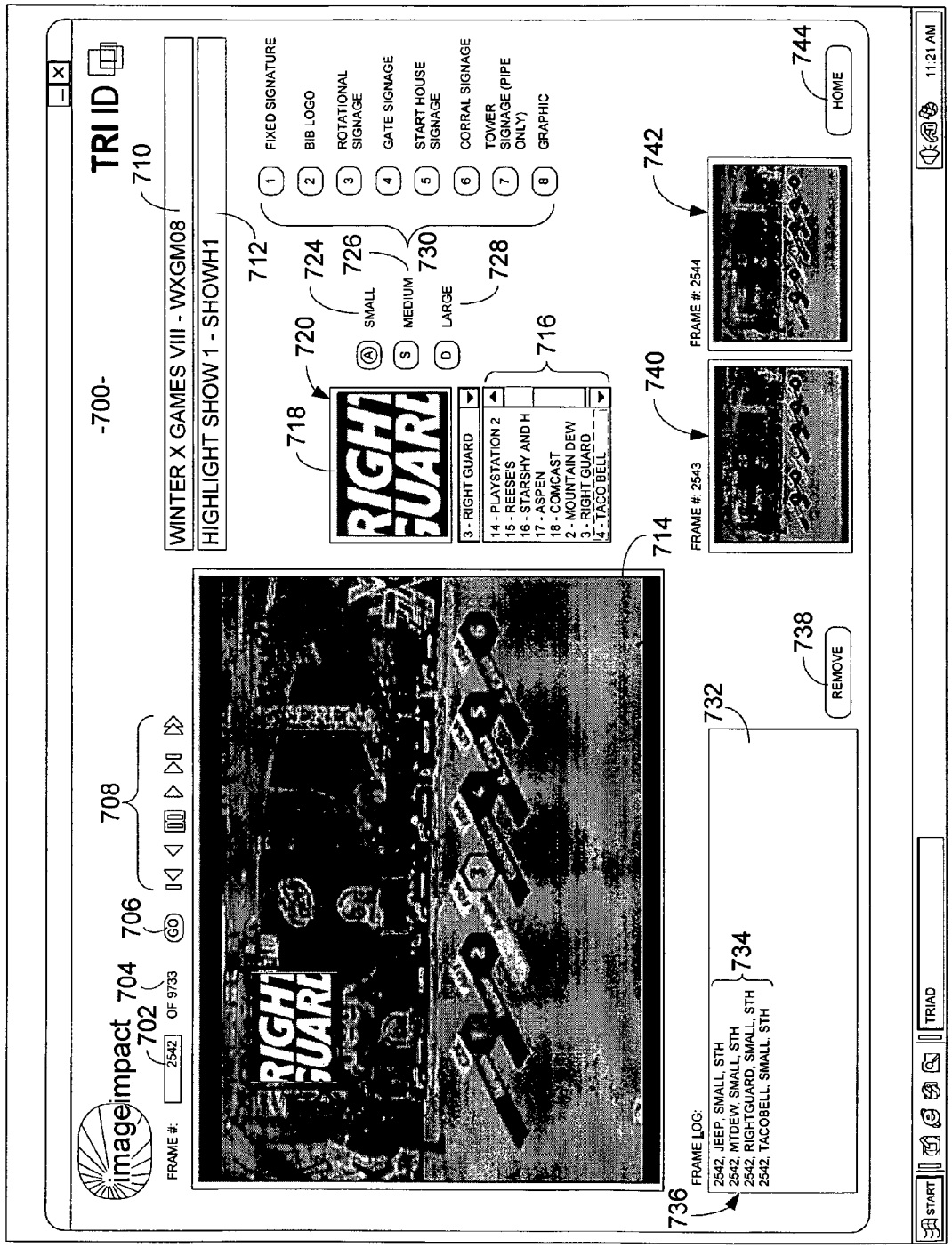
FIG. 23 depicts another interface in connection with detection application 130 used to facilitate recording data associated with detections in accordance with an embodiment of the present invention.

A detector then begins a detecting session by choosing a pending show and selecting the "detect" button 676, as indicated in FIG. 22. Clicking on "detect" button 676 present user interface 700, which is represented by a screenshot in FIG. 23. Screen 700 illustrates many functional aspects that greatly aid in the detection of advertising-content images. A frame identifier 702 indicates what frame a detector is currently viewing. A frame-count identifier 704 indicates the total number of frames associated with a given job. A detector may revert to a previously viewed frame by entering the desired frame number in box 702 and selecting "go" button 706. In one embodiment, detectors are prohibited from navigating past an unviewed frame. For example, FIG. 23 indicates that the detector is viewing frame number 2542. Assuming this is as far as the detector has gotten, the present invention would prohibit the detector from viewing say frame 4972. This methodology helps ensure the accuracy of final results by mandating that each and every frame be viewed, and viewed sequentially.

But if frames 126 include periods that of no interest, then a set of play-control buttons 708 are provided to rapidly advance past uninteresting content, such as television commercials as the case may be. This assumes that the sponsor is only interested in the appearance of its advertising images during the shooting of an event.

The title of the event is indicated in event-box 710 and the corresponding show is indicated in box 712 in one embodiment. In one embodiment, a detector observes a current frame 714 and identifies each occurrence of advertising images that corresponds to a set of advertisers 716. The list 716 of advertisers, or sponsors, lists each advertiser of interest. When a specific advertiser is selected from list 716, an exemplary sponsorship-logo image 718 is depicted in image preview box 720. By providing image preview 718, hits can be logged by detectors who are unfamiliar with a specific sponsor's logo. Viewing each frame, a detector logs individual hits.

As summarily defined above, a hit is any frame that includes the occurrence of an advertising image of interest. A hit is not necessarily a detection, although it may help compose a detection. During the analysis phase (230F), detections will be determined based on attributes logged and associated with each individual frame.

In one embodiment, a detector may rapidly log a hit by entering only three snippets of data: the logo key map, a size indication, and a source indication. A logo is preferably identified by entering the key map sequence of list 716. Next, the present invention receives one of a plurality of size indicators, such as small 724, medium 726, and large 728. In the embodiment shown, small-indicator 724 corresponds to the letter "A." Similarly, a medium-sized image is entered by depressing the letter "S" and a large image is indicated by depressing the letter "D." The present invention is not limited to only three sizes identifiers, but three have been shown to illustrate the functionality offered by one embodiment of the present invention.

Image size is preferably determined with respect to the amount of screen real estate that an image consumes. This way, a small image will be considered small whether viewed on a 13-inch television screen or on a much larger projection screen. Various screen-real-estate percentages can be attributed to size indicators 724, 726, and 728.

For example, a small image may be an image that consumes 5% of the viewing screen. Alternatively, a small image may be defined to cover 7.5% or 10%, etc. of the screen. A medium image may be defined to be any image larger than a small image but smaller than say some multiple of a small image. Finally, a large image would be any image larger than a medium image. If more precise detail is desired, then a greater number of size delineators can be provided. A sizing tool can also be provided whereby a user can use a pointing device such as a mouse to outline an image on the screen. Its size will then be automatically determined based on the size of the outline.

The final key sequence to be entered to tag an image is a source identifier selected from list 730. Exemplary sources of advertising images are provided in FIG. 23 and illustratively include "fixed signage," "bib logo," "rotational signage," "gate signage," "start house signage," "corral signage," "tower signage," and "graphic." Any number of signage sources can be defined and associated with a show, as was explained and is illustrated with reference to FIG. 13, reference numeral 530. The attributes received by detection application 130 are reflected in frame-log box 732. An exemplary list 734 of received data is provided for illustrative purposes.

An example of logging a hit for a given sponsorship image will now be provided. Suppose that a detector wishes to indicate the occurrence of a "Right Guard" logo in image 714. According to one embodiment, the present invention need only receive the following input, which can take the form of key sequences: "3, A, 5." Thus, by merely entering the numeral "3," clicking the letter "A," and typing the numeral "5," a detector is able to rapidly indicate that a small "Right Guard" image appears at the start house.

This entry is indicated by row 736 of list 734 in frame log 732. Also indicated in frame log 732 is data that indicates a small "Jeep" image is also present with the "Right Guard," as well as a small "Mountain Dew" image and a small "Taco Bell" image. In one embodiment, the present invention automatically populates frame log 732 with the current frame number 702. In one embodiment, a detector provides a delimiting action (such as pressing the plus "+" key) before adding each addition hit sequence to a frame. Detection application 130 is preferably coded to receive only certain types of key sequences, and when those key sequences are received, it automatically processes the data based on the input received. For example, detection application 130 can be coded to first receive a numeric string, then a single letter, and finally another numeric string.

Detection application 130 can be further developed so as to recognize numerical strings only within the specific ranges. In this embodiment, logos can be key mapped to a given range, say one through twenty, while source identifiers 730 can be associated with a different range, perhaps thirty through forty. In this manner, detection application 130 expects to receive three snippets of data: first, a numeral one through twenty, second, a letter, and finally a numeral thirty through forty. Infinite to receiving the numeral thirty through forty, detection application 130 knows to advance to the next line, pre-populating it with the respective frame number 702. Such a scheme would make for very rapid image tagging.

If an error was made in entering data into frame log 732, then a user may remove an entry by clicking the "remove button 738. Other helpful data items can be included in user interface 700. For example, a preview of one or more frames can be provided, such as indicated by a first frame-preview pane 740 and a second frame-preview pane 742. A detector may navigate to a predefined screen by selecting the "home" button 744. A detector continues in this manner to associate a set of attributes with each frame of a given frame set, such as frame-set 126. After this is completed, the data in frame log 732 will be used to create a detection report, which in one embodiment takes the form of an XML file.

Figure 24:
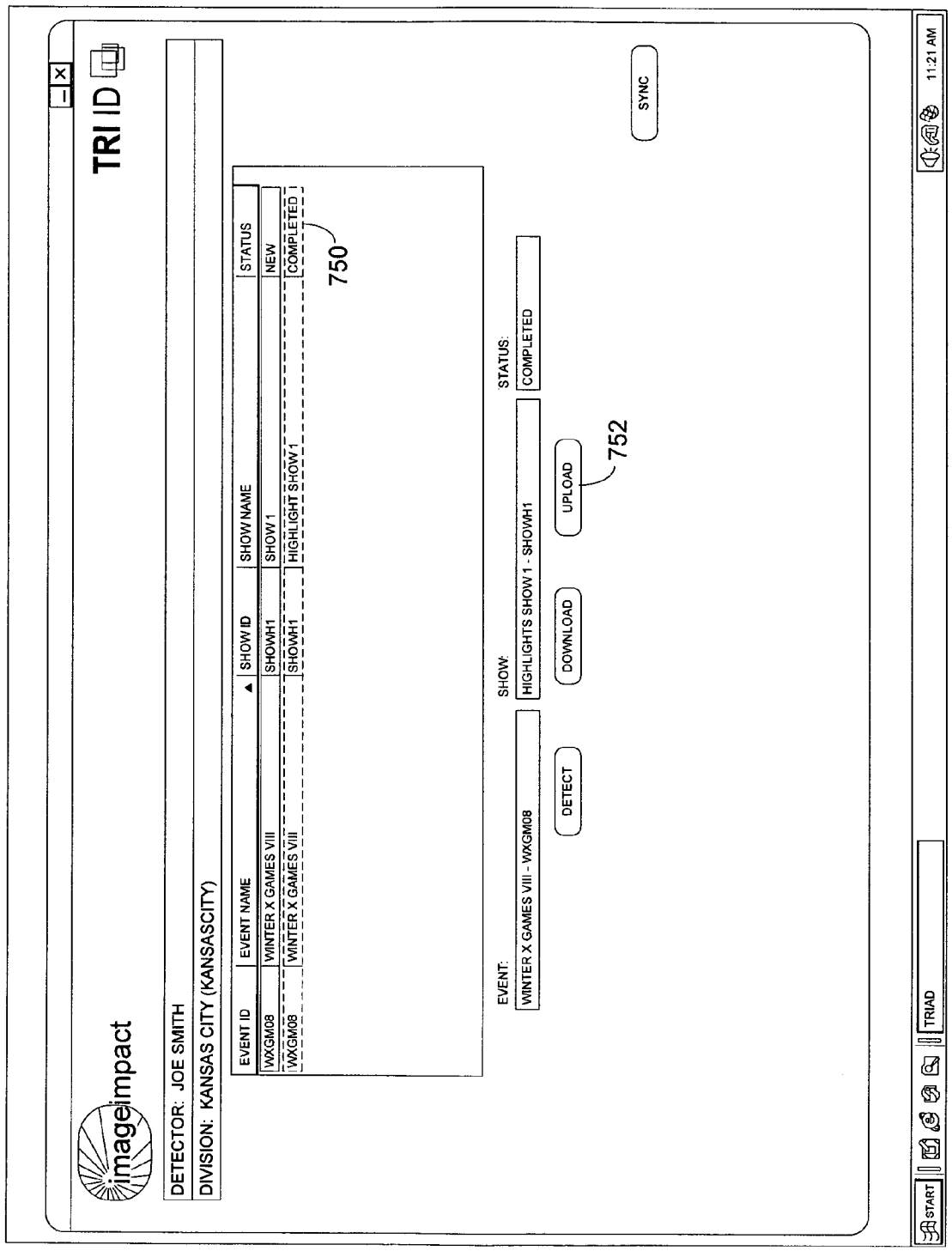
FIG. 24 depicts an illustrative interface for conveying information associated with shows that have been processed.

After a detector has completed viewing all images of a given frame set, that job is indicated as "completed" as can be seen by FIG. 24 with reference to numeral 750. Thus, the detection report can be received by server 118 in step 230E by automatically remote retrieval or by a detector selecting the applicable show and clicking the "upload" button 752.

As previously mentioned, detection report 132 takes the form of an XML file in one embodiment. Turning now to FIG. 25, an illustration of a portion of detection report 132 is provided. As shown, the detection report includes entries that define attributes associated with each of the various frames 126. For illustrative purposes, detection report 132 is shown to include labels and corresponding values that represent a detection key 760, frame number 762, logo identifier 764, size identifier 766, and location ID 768. Any amount of information can be stored in detection report 132. One should not construe the illustrative depiction of the five parameters shown as a limitation of the present invention. Rather, exemplary parameters are shown so as to not obscure the present invention. Detection key 760 uniquely identifies each attribute record. Frame number 762 represents the frame number to which the attributes correspond. For example, with reference to record 770, it can be observed that a small "Right Guard" logo appeared as start-house signage in frame number 2541. Note from records 772 and 774 that a "Mountain Dew" logo as well as a "Taco Bell" logo also appeared in frame number 2541. This is an example of one of the steps carried out in step 230F, where detection report 132 is analyzed to determine various attributes. One such attribute is isolation or non-isolation. That is, a desirable attribute is to know whether an advertising image appeared by itself or together with other advertising images.

If a logo appeared by itself, in the absence of other advertising images, then it is referred to herein as being in isolation. If more than one logo was observable in a given frame, then each logo is the to be in non-isolation. The determination as to whether a logo is in isolation can be gleaned by analyzing detection report 132. For example, if a given frame number appears in multiple records, with differing logo IDs, then each logo was not in isolation. But if a frame number is associated with only a single logo ID, and no other records share that frame number with a different logo ID, then it can be determined that the image in question appeared in isolation. An example of a logo appearing in isolation can be seen with reference to record 782.

Record 782 indicates that a "Mountain Dew" logo appeared in frame number 2453. And because no other records indicate a hit associated with frame number 2543, it can be determined that the "Mountain Dew" logo appeared in isolation in frame 2543. This data will ultimately be used in the valuation process to attribute a higher value to those images that appeared in isolation as compared to those images that did not.

Another illustrative metric that can be gleaned by examining detection report 132 is whether an image is repeated or not. A repeating image is an image that appears in duplicate in a single frame. For example, consider records 776 and 780.

Record 776 indicates that a "Right Guard" image appeared in frame number 2544, and record 780 also indicates that a "Right Guard" Image appeared in frame number 2544. But because records 776 and 780 have different detection keys, it can be determined that two "Right Guard" images appeared in frame 2544. Thus, the present invention allows data to be analyzed very quickly by a computer, and data to be gathered very accurately by a human being.

Clearly, size and location can easily be determined from detection report 132. Significantly, extensive analysis can be performed on all occurrences of images in native footage 110. A human being does not need to keep track of whether an advertising image occurred with other images. Similarly, a human being does not need to track whether an image appeared in duplicate in various presentations of an event. Rather that processing is preferably done by server 118. The present invention marries the best of two worlds by enabling rapid association of multiple attributes with each selected frame of a given event with the processing power of a computer such as server 118. For example, a human being is relieved of the task of quantifying the precise duration that an advertising image persists in native footage 110.

Having sampled a select number of frames, an accurate and objective determination can be made as to how long an image was viewable to a human audience. If an image occurred in three contiguous frames, and each frame can be associated with a specific duration, then a total duration can be computed. For example, with reference to FIG. 25, records 772, 775, and 782 indicate that a small "Mountain Dew" image appeared in frames 2541, 2542, and 2543. Assuming that each frame represents ⅓ of a second, server 118 can rapidly determine that the "Mountain Dew" image persisted for one second. Employing this technology allows a user to separate detections from hits.

As used herein, a detection refers to an image that has persisted past a threshold duration, whereas a hit is merely the occurrence of an image in a single frame. If a sponsor determined that only images that had a duration of at least one second were to be counted as detections, then the present invention would not count as detections any images that did not appear in at least five contiguous frames. Those skilled in the art will appreciate that virtually any threshold can be met by commensurately sampling native footage 110.

Thus, one aspect of the analyzing phase (see FIG. 2C, 230F) is to identify detections and attributes associated with those detections, such as repeating and whether they were in isolation or not. With this phase complete (or contemporaneously), each detection is indexed at a step 240 (see FIG. 2). In one embodiment, indexing detections includes associating an Individual Detection Score (IDS) IDS with each detection. A detailed explanation of deriving and associating IDSs with each detection will now be provided.

Valuation Metrics

As summarily mentioned in Table 1, the term "Image Monetary Indicator" (IMI) is used herein to denote a measurement of the monetary value of a sponsor's signage package, graphics, and audio mentions for a televised event. Audio mentions include sounds related to an item to be promoted, such as a sponsor's name, jingle, or identifying sound. Similar to rose being known by another name, those practicing in the art may use other names to denote a monetary value, but such other names indicate a valuation concept contemplated within the scope of the present invention. The IMI is used to indicate a monetary value of the impact potential (as measured by the Image-Impact Indicator) relative to a benchmark metrics, such as a negotiated 30-second spot value programming ratings.

The Image-Impact Indicator (III) metric measures viewer impression, or the degree to which a signage package (images, graphics, audio mentions, etc.) leverages the opportunities provided through a televised broadcast of a sponsored event. As with the IMI above, artisans may use other names, acronyms, or abbreviations to refer to what the III measures, and such other references are contemplated within the scope of the present invention. The Image-Impact Indicator is derived from an aggregation of the impact ratings for the individual detections of a sponsor's signage during a televised event. Generally, the impact potential of a detection increases as a detection's duration and size increase. The impact potential is greatest when a sponsor's signage appears in isolation of competing signage and diminishes as detection clutter grows.

The impact potential of an individual detection is also affected by its type. A graphic detection, and audio detection, or a combination audio/graphic detection will generally have greater impact value than signage. The impact value of a sustained detection diminishes over long duration periods. The monetary value of a signage package can be affected by other variables, such as by the sponsorship tier. These and other variables (including all of the variables mentioned above and those to be described below) can be taken in by present invention to generate relevant and comprehensive valuation scores.

Prior to describing in detail how an EII is derived according to an embodiment of the present invention, the following description is provided as a high-level introduction: First, an IDS is determined for each detection of interest (step 240, FIG. 2). This includes ascertaining the impact value for the associated category of each detection, and making appropriate type adjustments to the detection's category value. Next, the present invention determines the collective impact (III) by accumulating the adjusted impact values for all detections; determining the potential impact for all detections; and deriving the ratio of these two calculations (step 250, FIG. 2).

*A preferred method of calculating the IMI (at an introductory level) begins with adjusting the actual duration of a detection for each sustained detection. Then, for each detection, the individual detection scores are scaled to create a duration adjustment factor (DAF). Next, an adjusted signage duration (ASD) is calculated as the sum of the products of the corrected durations and the duration adjustment factor. Finally, the ASD is converted to a monetary value based on a benchmark metric, such as a negotiated 30-second spot value and adjusted for other variables of interest such as ratings, sponsorship tiers, event size, viewing ratings, viewing audience, etc.

A more in-depth discussion of the technologies, algorithms, and other factors that realize the valuation metrics will now be provided, beginning with Table 2, which describes various functions, arguments, values, and resources.

TABLE 2

Function Signatures

| Function | Argument(s) | Returned Value | Resources |
| --- | --- | --- | --- |
| III | detection-set | Real | *min-dur-cat-val* |
|  |  |  | *max-dur-cat-val* |
|  |  |  | *min-size-cat-val* |
|  |  |  | *max-size-cat-val* |
|  |  |  | *min-iso-cat-val* |
|  |  |  | *max-iso-cat-val* |

TABLE 2-continued

Function Signatures

| Function | Argument(s) | Returned Value | Resources |
|---|---|---|---|
| IMI | detection-set | Dollars | *n30ss$*<br>*sponsorship-adj-factor*<br>*tvadj*<br>p<br>q<br>e |
| ASD | detection-set | Real | *min-dur-cat-val*<br>*max-dur-cat-val*<br>*min-size-cat-val*<br>*max-size-cat-val*<br>*min-iso-cat-val*<br>*max-iso-cat-val* |
| detections-xyz | detection-set;<br>x: duration category value;<br>y: size category value;<br>z: isolation category value | detection-set | |
| duration-category | detection | detection | *dur-min*<br>*dur-1-2*<br>*dur-2-3*<br>*dur-max* |
| duration* | detection | Real | *dur-max*<br>*dur-flat*<br>*dur-adj-floor* |
| detection-class-index | detection | tuple: <x, y, z> | |
| detection-adj-factor | detection | Real | *IDS-adj-factor-table* |
| IDS | detection | Real | |
| DAF | detection | Real | *min-dur-cat-val*<br>*max-dur-cat-val*<br>*min-size-cat-val*<br>*max-size-cat-val*<br>*min-iso-cat-val*<br>*max-iso-cat-val*<br>*DAF-min*<br>*DAF-max* |
| IDS-cat | x: duration category value;<br>y: size category value;<br>z: isolation category value | Real | *IDS-table* |
| IDS-category-value | x: duration category value;<br>y: size category value;<br>z: isolation category value | Real | *min-dur-cat-val*<br>*max-dur-cat-val*<br>*min-size-cat-val*<br>*max-size-cat-val*<br>*min-iso-cat-val*<br>*max-iso-cat-val*<br>*iso-seed-val-1*<br>*iso-seed-val-2*<br>*size-inc-factor* |

Detections

As previously mentioned, a detection is an appearance of a sponsor's logo during a televised event that meets certain criteria, such as at least a minimum size or persisting for at least a minimum duration. An individual detection is preferably described by three primary attributes: duration, size, and isolation.

TABLE 3

Detections

| Action | Result |
|---|---|
| size | is a measure of how large the signage appears relative to the size of the screen in which it is seen. The value of a detection is directly proportional to its size. The larger the size, the greater the value. |

TABLE 3-continued

Detections

| Action | Result |
|---|---|
| duration | the length of time the signage appears on the screen. The value of a detection is directly proportional to its duration. The longer the duration, the greater the value. |
| isolation | an indication of whether sponsor detections appear along detections of other sponsors. If no other sponsor detections occur during the detection of focus, then the detection is isolated. The value of an isolated detection is greater than that of a non-isolated detection. |

Detections are preferably classified according to the values of their primary attributes (duration, size isolation).

TABLE 4

Detection Classification

| Name | Definition |
|---|---|
| Duration Categories | Individual detections are preferably assigned to one of n duration categories referred to as $d_1, d_2, \ldots, d_n$. Detections classified as being in size category $d_i$ are larger than those classified as being in category $d_{i-1}$ for all i such that $1 \le i \le n$. |
| Size Categories | Individual detections are preferably assigned to one of m size categories referred to as $s_1, s_2, \ldots, s_m$. Detections classified as being in size category $s_i$ are larger than those classified as being in category $S_{i-1}$ for all i such that $1 \le i \le m$. |
| Isolation Categories | Individual detections are assigned to one of i isolation categories referred to as $c_1, c_2, \ldots, c_l$. Detections classified as being in isolation category $c_i$ are larger than those classified as being in category $c_{i-1}$ for all i such that $1 \le i \le l$. |

The number of different detection classes defined by the primary attribute categories is the product of the number of divisions associated with each attribute in one embodiment. If there are n duration categories, m size categories and l isolation categories, then there are n*m*l detection categories. Thus, three duration divisions, three size divisions and two isolation divisions would result in 18 of detection classes or categories. What is most important here, is that individual detection scores are indexed and then used to generate an overall impact factor. An artisan could as easily opt to use two variables that could take on four different values to create 16 categories; or six values that take on two attributes to create 64 categories; etc. The present invention advances the art, in one aspect, by provided an indexing methodology at all, not necessarily the exemplary one described and to be described in greater detail below.

If x is the duration category index, y is the size category index and z be the isolation category index, then <x, y, z> uniquely identifies a detection class. In accordance with the category definitions above, <3, 3, 2> would be the name of the detection class consisting of all long, large and isolated detections. Similarly, <1, 1, 1> would be the name the detection class consisting all detections having short duration, small size, and appearing simultaneously with logos of other sponsors. Those skilled in the art would readily appreciate alternative naming schemes. The aforementioned naming or identification format is arbitrary. The number of individual detections in detection class <x, y, z> is represented herein as $n_{<x,y,z>}$.

Deriving Individual Detection Scores

IDS values are preferably determined by the duration, size, and isolation attributes of an individual detection. Both the duration and size attribute values are classified as being in one of three different categories—d(1), d(2), or d(3); and s(1), s(2), or s(3) respectively. The isolation attribute value is currently in one of two categories—i(1) or i(2). For convenience, the concatenation of the category subscripts is used as an identifier of the 18 different categories used in one embodiment. The duration subscript occurs first, the size second, and the isolation identifier appears third. Therefore, the category 3,2,1 represents a detection of long duration, medium size, of appearing in isolation.

To understand how the IDS values are determined and how they relate to one another, it is beneficial to understand first how the value of a detection changes with respect to changes in its duration and size.

Duration: The value of a detection increases as duration increase. The present invention contemplates a model whereby detection value increases linearly with duration, although other scaling valuations could be used. If one second of duration is worth x, then two seconds of duration would be worth 2 x, three seconds would worth 3 x, and so on. That is, each additional unit of duration adds a constant amount of additional value to the detection if all other attributes (e.g. size, isolation, . . . ) of the detection remain unchanged.

Size: The value of a detection also increases as size increases. But the present invention contemplates in its preferred embodiment valuation increasing at an increasing rate as the size of the detection increases. The value of a detection is directly related to the amount of screen real estate it occupies on the screen. In this sense, the value can be explained similar to the value associated with the duration of a detection. If a detection that occupies x square units of space on the screen is worth y, then a detection that occupies 2x square units of space on the screen will be worth 2 y. However, this explanation can be unintentionally misleading. What one must realize is that the amount of real estate gained by an increase in the height and width of a small detection may be significantly less than the amount of real estate gained by the same increase in the height and width of a large detection.

The following example will illustrate this point. Consider a detection that is 10×20=200 pixels. A one-unit increase in both the height and the width of the detection will result in an 11×21=231 pixels detection. The increase in the area of the detection is 31 pixels. Now consider a detection that is 50×100=5000 pixels. A one unit increase in both the height and the width of the detection will result in an 51×101=5151 pixels detection. The increase in the area of the detection is 151 pixels which is almost 5 time the absolute value of the increase of the smaller detection for the same absolute increase in the length and width dimensions of the detection. Accordingly, the present invention embraces stands to reason that the value of a larger detection changes more than the value of a small detection for the same absolute change in the detection dimensions.

Isolation: A value of a detection decreases when another detection appears simultaneously on the screen because viewers must split their attention between the two or more different images. The magnitude of the change in a detection's value as it moves from an isolated state to a non-isolated state is specifically related to its duration. Specifically, moving from an isolated state to a non-isolated state has less of a negative effect on a longer duration detection than it does on a shorter duration detection. For longer duration detections, the eye and the brain have more time and therefore a higher probability of seeing the detections even if they are not in isolation.

Detection Class Values: In the implementation, the number "1" is arbitrarily chosen for illustrative purposes as the IDS value of a detection that would be in the smallest duration category, smallest size category and not appearing in isolation. This detection would be in detection class 1,1,1. All the IDS values for the remaining 17 detection classes are built from the IDS of the 1,1,1 class in this example.

Based on experience in the industry, it has been reasoned that the value of a class 1,1,2 detection is twice the value of a class 1,1,1 detection. That is, small detections of small duration, in isolation is worth double the value of a detection that is not in isolation. Because the IDS of class 1,1,1 is "1" (i.e. $ids_{1,1,1}=1$) then the IDS of class 1,1,2 is "2" (i.e. $ids_{1,1,2}=2$).

Duration increments. Fixing the size attribute, for example all small detections—size category s(1)—an increase in duration category (e.g. from d(i) to d(i+1)), a detection is awarded a value increment of "2" while the isolation attribute is held constant. Because $ids_{1,1,1}=1$ and $ids_{1,1,2}=2$, then $$ids_{2,1,1}=ids_{1,1,1}+2=1+2=3, \text{ and } ids_{3,1,1}=ids_{2,1,1}+2=\text{three}+2=5; \text{ and}$$

$$ids_{2,1,2}=ids_{1,1,2}+2=2+2=4, \text{ and } ids_{3,1,2}=ids_{2,1,2}+2+=6.$$

Size increments: For each category increase in size, the value of the detection is doubled according to one embodiment. In other embodiments, a different factor could be attributed or no factor at all. Although the doubling occurs independent of the duration category, the following example illustrates the effect for the d(1) duration category. Because $ids_{1,1,1}=1$ and $ids_{1,1,2}$ 2, then $$ids_{1,2,1}=2(ids_{1,1,1})=2(1)=2, \text{ and } ids_{1,3,1}=2(ids_{1,2,1})=2(2)=4; \text{ and}$$

$$ids_{1,2,2}=2(ids_{1,1,2})=2(2)=4, \text{ and } ids_{1,3,2}=2(ids_{1,2,2})=2(4)=8.$$

Table 5 completes the construction of the IDS values for all 18 detection classes according to the provided example.

TABLE 5

| | IDS Classes | | | | | |
|---|---|---|---|---|---|---|
| | d(1) | | d(2) | | d(3) | |
| S(1) | $ids_{1,1,1}$ = "1" | $ids_{1,1,2}$ = "2" | $ids_{2,1,1}$ = "3" | $ids_{2,1,2}$ = "4" | $ids_{3,1,1}$ = "5" | $ids_{3,1,2}$ = "6" |
| S(2) | $ids_{1,2,1}$ = "2" | $ids_{1,2,2}$ = "4" | $ids_{2,2,1}$ = "6" | $ids_{2,2,2}$ = "8" | $ids_{3,2,1}$ = "10" | $ids_{3,2,2}$ = "12" |
| S(3) | $ids_{1,3,1}$ = "4" | $ids_{1,3,2}$ = "8" | $ids_{2,3,1}$ = "12" | $ids_{2,3,2}$ = "16" | $ids_{3,3,1}$ = "20" | $ids_{3,3,2}$ = "24" |

Duplicate IDS values for different detection Classes: Duplicates occur as a natural part of the building process but can be explained in terms of value changes related to simultaneous changes in detection attribute values. Five values are repeated in the IDS value matrix. They are 2, 4, 6, 8, and 12 and occur as the IDS values of the following detection classes:

$$ids_{1,1,2}=ids_{1,2,1}=2$$

$$ids_{1,3,1}=ids_{1,2,2}=ids_{2,1,2}=4$$

$$ids_{2,2,1}=ids_{3,1,2}=6$$

$$ids_{1,3,2}=ids_{2,2,2}=8$$

$$ids_{2,3,1}=ids_{3,2,2}=12$$

In each case, moving from one detection class to another that has the same IDS value involves a trade-off in values related to detection attribute changes that result in a wash. For example, in the first case ($ids_{1,1,2}=ids_{1,2,1}=2$), the value lost in moving from an isolated state a non-isolated state is offset by the value gained by an increase in size. Similarly, in the fourth case ($ids_{1,3,2}=ids_{2,2,2}=8$), the value gained by an increase in the detection's duration is offset exactly by the value lost from the decrease in the detection's size. All duplicate IDS values can be explained by these types of value trade-offs due to changes in detection attribute values.

Detection Class Attributes

A detection class is characterized by one primary attribute: the individual detection score category value (IDS-cat). The IDS-cat of a detection class is a value indicating the relative impact of an individual detection in that class. For example, if the <3, 3, 2> detection class has an IDS-cat value of "24" and the <1, 1, 1> detection class has a IDS-cat value of "1," then the impact potential of a <3, 3, 2> detection is taken to be 24 times greater than that of a <1, 1, 1> detection. The IDS-cat value is a function the size-category, duration-category, and isolation-category attribute values that define the detection class.

Computing IDS-Cat Values

TABLE 6

Computing Values

Let
x     be the value of the size category and x is an integer such that *min.size.cat.value* ≤ x ≤ *max.size.cat.value*,
y     be the value of the duration category and y is an integer such that *min.dur.cat.value* ≤ y ≤ *max.dur.cat.value*,
z     be the value of the isolation category and z is an integer such that *min.iso.cat.value* ≤ z ≤ *max.iso.cat.value*
where:
*min.size.cat.value* is an integer value assigned to the smallest detection size category,
*max.size.cat.value* is an integer value assigned to the largest detection size category,
*min.dur.cat.value* is an integer value assigned to the smallest detection duration category,
*max.dur.cat.value* is an integer value assigned to the largest detection duration category,
*min.iso.cat.value* is an value assigned to the least isolated detection isolation category,
*max.iso.cat.value* is an value assigned to the most isolated detection isolation category.

Give Table 6 above IDS-cat is preferable computed as follows:

$$ids.cat_{<x,y,z>} = f_1(duration.category=x, size.category=y, isolation.category=z)$$

Exemplary detection rules are set forth in Table 7 below.

TABLE 7

Detection Rules
The calculation of IDS-cat is governed by the following three exemplary rules:

1. The Detection Duration Rule:
$ids.cat_{<x,y,z>} = ids.cat_{<x-1,y,z>} + ids.cat_{<x-2,y,z>}$ The individual detection score category value for category <x, y, z>. is the sum the individual detection score category values for the previous two categories <x-1, y, z> to <x-2, y, z>.
2. The Detection Size Rule: $ids.cat_{<x,y,z>} = ids.cat_{<x,y-1,z>} \times$ size.factor
If the size factor is 2, then the individual detection score category value doubles from <x, y-1, z> to <x, y, z>.

TABLE 7-continued

Detection Rules
The calculation of IDS-cat is governed by the following three exemplary rules:

3. The Detection Isolation Rule:
$ids.cat_{<x,y,z>} = ids.cat_{<x,y,z-1>} \times$ isolation.factor If the isolation factor is 2, then the individual detection score category value doubles from <x, y, z-1> to <x, y, z>. This factor is realized in the algorithm as the difference between isolation seen values. (See the computation definition below).

Table 8 sets forth a more formal specification for the computation for all IDS-cat values.

TABLE 8

Computation for Formal Specification $ids.cat_{<1,1,1>}$ = iso-1-seed-value
   ...
$ids.cat_{<1,1,n>}$ = iso-n-seed-value
$ids.cat_{<2,1,z>} = ids.cat_{<1,1,z>} + ids.cat_{<1,1,z>}$
   for min.iso.cat.value ≤ z ≤ max.iso.cat.value
$ids.cat_{<x,1,z>} = ids.cat_{<x-1,1,z>} + ids.cat_{<x-2,1,z>}$
   for min,dur.cat.value + 1 < x ≤ max.dur.cat.value, and,
   min.iso.cat.value ≤ z ≤ max.iso.cat.value
$ids.cat_{<x,y,z>} = ids.cat_{<x,y-1,z>} \times$ size-inc-factor
   for min,dur.cat.value ≤ x ≤ max.dur.cat.value, and,
   min.iso.cat.value + 1 ≤ y ≤ max.iso.cat.value
   min.iso.cat.value ≤ z ≤ max.iso.cat.value
where:
   iso-n-seed-value = the index value for a detection whose isolation category value is n, size category value is 1 and duration category value is 1,
   size-inc-factor = the multiplier for a one unit increase in the size category value of a detection
   iso-1-seed-value = the minimum IDS-cat value that will be assigned to a non-isolated detection.
   iso-n-seed-value = the maximum IDS-cat value that will be assigned to an isolated detection.

Regarding the above, all category values for size, duration, and isolation are preferably taken from ranges of consecutive integers between the respective minimum and maximum values. The magnitude of the difference between the iso-n-seed-value-s determine the relative differential between the various degrees of isolated detections. The value of the variable size-inc-factor determines the rate at which the IDS-cat increases with one unit increases in the detection size category. The rate of increase in IDS-cat with respect to duration category increases is a function of the value of the two previous duration category IDS-cat values within the same isolation and size categories.

Detections Attributes

Table 9 describes attributes of individual detections. Their values are either supplied from the analysis process (step 230F, FIG. 2C) or are computed from available information.

TABLE 9

Attributes of Individual Detections

| | Attribute | M | Type | Description |
|---|---|---|---|---|
| 1 | detection-type | 1 | enumerated type [a, g, ag, s] | from analysis<br>a - audio mention<br>g - graphic<br>ag - audio/graphic<br>s - signage<br>(equivalent to the "source" field in the current db) |
| 2 | duration | 1 | real | from analysis |
| 3 | size-category | 1 | integer range $[x_1, \ldots, x_n]$ | from analysis<br>$x_1$ - *min-size-cat-value*<br>$x_n$ - *max-size-cat-value* |
| 4 | iso-category | 1 | integer range $[y_1, \ldots, y_n]$ | from analysis<br>$y_1$ - *min-iso-cat-value*<br>$y_n$ - *max-iso-cat-value* |
| 5 | dur-category | 1 | integer range $[z_1, \ldots, z_n]$ | calculated value<br>$z_1$ if *dur-min* <= duration < *dur-1-2*<br>...<br>$z_n$ if *dur-(n−1)-(n)* <= duration < *dur-max*<br>See below: Determining the Duration Category of a Detection |
| 6 | duration* | 1 | real | calculated value<br>This is duration adjusted for diminishing value of sustained detections.<br>See below: Calculating Diminishing Value of Duration for Sustained Detections |
| 7 | IDS | 1 | real | calculated value<br>Individual Detection Score: This is the IDS-cat value of an individual detection score adjusted for detection-type.<br>For example: if detection-type =<br>a: IDS = IDS-cat × 2.00<br>g: IDS = IDS-cat × 2.00<br>ag: IDS = IDS-cat × 4.00<br>s: IDS = IDS-cat × 1.00<br>See below: Calculating the Individual Detection Score |
| 8 | DAF | 1 | real | calculated value<br>Duration Adjustment Factor: This is a factor that is defined to be proportionally equivalent to the IDS. The DAF is used to adjust the duration of an individual detection for signage valuation purposes.<br>See below Calculating Duration Adjustment Factors Proportionally Equivalent to IDS |

Determining the Duration Category of a Detection

Each duration category is preferably referenced by an integer value ranging from *min,dur.cat.value* to *max,dur.cat.value*, where n is the total number of duration categories allowed.

The category boundaries will be specified by the parameters outlined in Table 10 below.

TABLE 10

Determining Duration Category

*dur-min* = the smallest duration time allowed
*dur-(i)-(j)* = the duration time that serves as the boundary between category i and category j.
*dur-max* = the duration time after which the value of the duration begins to diminish.
For example, the following parameter assignments specify three duration categories 1, 2, and 3
d1) = 0–1.5 s
(d2) = +1.5–3.0 s
(d3) = 3.0 s and above
where:
  Category 1 contains all detections whose duration is such that: 0 (or other min, such as .6 s) ≤ duration < 1.5

TABLE 10-continued

Determining Duration Category

Category 2 contains all detections whose duration is such that: 1.5 ≤ duration < 3.0
Category three contains all detections whose duration is such that: 3.0 ≤ duration
  *dur-max* is used in the calculation of duration* which in this example would discount duration time in excess of 5.0 second.
  See the section titled: Calculating the Diminishing Value of Duration for Sustained Detections

Calculating the Diminishing Value of Duration for Sustained Detections

Figure 26:
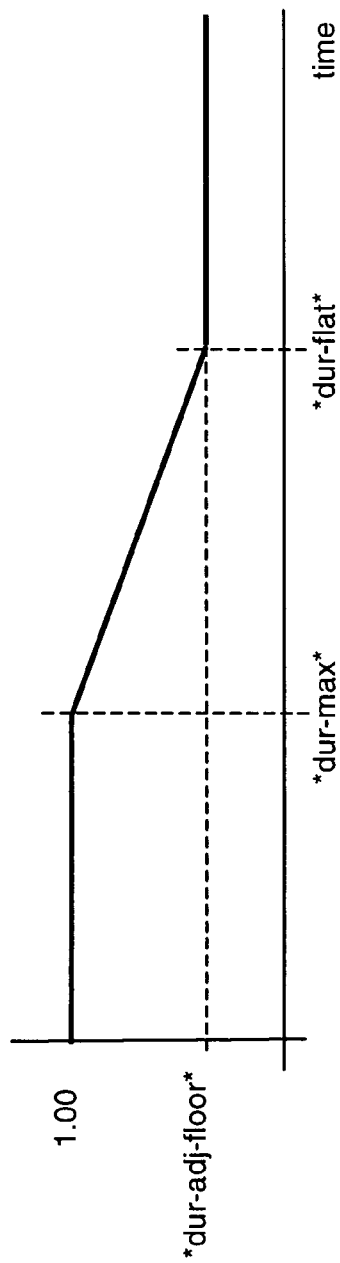
FIG. 26 is a graph depicting an exemplary diminishing return of prolonged image appearance.

A sustained detection is one whose duration value exceeds *dur-max*. *dur-max* bounds the outer limit of the largest duration category. The value of any time in excess of *dur-max* is uniformly devalued until the minimum duration adjustment value (*dur.adj.floor*) is reached at the time *dur-flat*≥*dur-max*. The longer the detection persists after the threshold, the less the excess duration is subsequently valued on average. The value of any excess duration never goes below *dur.adj.floor*. FIG. 26 depicts an illustration of how the duration of a detection devalues over longer periods of time. With reference to FIG. 26, let duration* represent the duration of a sustained detection after adjustments. There are three cases to consider when calculating duration*, which are set forth in Table 11 below.

TABLE 11

Determining Duration Category case 1: for duration ≤ *dur-max*
  duration* = duration
case 2: for dur-max* < duration ≤ *dur-flat*
  duration* = *dur.max* +

$$\left(1 - \frac{1}{2}h_1\right)(\text{duration} - *\text{dur.max}*)$$

where:

$$h_1 = \frac{(1 - *\text{dur.adj.floor}*)}{(*\text{dur.flat}*-*\text{dur.max}*)}(\text{duration} - *\text{dur.max}*)$$

case 3: for *dur-flat* ≤ duration
  duration* = *dur.max* +

$$\frac{1}{2}(*\text{dur.flat}*-*\text{dur.max}*)(1 - *\text{dur.adj.floor}*) +$$
$$(*\text{dur.flat}*-*\text{dur.max}*)*\text{dur.adj.floor}* +$$
$$(\text{duration} - *\text{dur.flat}*)*\text{dur.adj.floor}*$$

Calculating the Individual Detection Score

An individual detection score (IDS) of a detection is the IDS-cat score of the detection's detection class adjusted for detection-type. The IDS value captures the impact potential of an individual detection relative to other detections.

TABLE 12

Individual Detection Score

To calculate the IDS of a detection in one embodiment:
1. find the IDS-cat associated with the detection's class
2. determine the detection's type (e.g. audio, graphic, audio-graphic, or signage)
3. find the adjustment factor associated with the detection's type
4. apply the factor to the IDS-cat value.
  The IDS of the $i^{th}$ detection in detection class <x, y, z> is:
  $ids_{<x,y,z>,i} = ids.cat_{<x,y,z>} \times \text{type.factor}(\text{detection.type}(det_i))$ Calculating Duration Adjustment Factors Proportionally Equivalent to IDS Duration Adjustment Factor (DAF): The DAF of a detection is an adjustment factor for the individual duration of a detections. The DAF is used to adjust the duration of an individual detection to reflect its relative impact potential when considering a detection's contribution to the overall monetary value of the signage package.

The DAF is a function of the IDS value for the individual detection of interest.

$$daf_{<x,y,z>} = f_2(ids_{<x,y,z>})$$

Where the IDS value captures the impact potential of a detection relative to other detections, the DAF value is a transformation of the IDS into a duration adjustment factor for the ultimate purpose of calculation monetary value. The relationship between IDS and DAF is a proportional scaling of the IDS value to the DAF range defined by *DAF.max* and *DAF.min*.

The formula for the DAF of the $i^{th}$ detection is set forth in Table 13:

TABLE 13

Detection Formula

DAF of the $i^{th}$ detection is:

$$daf_i = *daf.max* \frac{daf.range \times (ids.cat_{<d.max,s.max,i.max>} - ids_i)}{ids.range}$$

where:
  *daf.max* = the upper end of the DAF range. Generally *DAF.max* = 1.00
  *daf.min* = the lower end of the DAF range. For example *DAF.min* could be .10
  daf.range = *daf.max *-* daf.min*
  ids.range = $ids.cat_{<d.max,s.max,i.max>} - ids.cat_{<d.min,s.min,i.min>}$
  d.max = *max.dur.cat.val*
  s.max = *max.size.cat.val*
  i.max = *max.iso.cat.val*
  d.min = *min.dur.cat.val*
  s.min = *min.size.cat.val*
  i.min = *min.iso.cat.val*

The DAF.range determines the relative magnitudes of the duration adjustment factors.

As previously mentioned, the III is an indicator of the collective impact potential realized by a sponsor from an entire signage package as it was detected on a televised event. The III value is independent of market and the venue. The III is also preferably independent of variations in TV ratings and sponsor specific signage features. The III is computed over a set of detections.

The III for an event is calculated as follows in Table 14.

TABLE 14

Calculated III for an Event $$SVI = \frac{\sum_{x=1}^{d.max}\sum_{y=1}^{s.max}\sum_{z=0}^{i.max}\sum_{i=1}^{n_{<x,y,z>}} ids_{<x,y,z>,i}}{ids.cat_{<d.max,s.max,i.max>}\sum_{x=1}^{3}\sum_{y=1}^{3}\sum_{z=0}^{1} n_{<x,y,z>}}$$

for at least one $n_{<x,y,z>} > 1$
where:
  $ids_{<x,y,z>,i}$ is the individual detection score for the $i^{th}$ detection in detection class <x,y,z>,
  $ids.cat_{<d.max,s.max,i.max>}$ is the individual detection score category value for the $i^{th}$ detection in detection class <*max-dur-cat-val*, *max-size-cat-val*, *max-iso-cat-val*>,
  and
  $n_{<x,y,z>}$ is the number of individual detections in detection category <x,y,z>.

The Adjusted Signage Duration (ASD) of an event is the sum of the adjusted durations for all of a sponsor's detections for an event. In one embodiment, the durations are actually adjusted twice: once during the duration* calculation process and again using the DAF value. The ASD is computed over a set of detections, which are recited in Table 15 below.

TABLE 15

Calculated ASD $$ASD = \sum_{x=1}^{3}\sum_{y=1}^{3}\sum_{z=0}^{1}\sum_{i=1}^{n_{<x,y,z>}} daf_{<x,y,z>,i} \text{duration}*_{<x,y,z>,i}$$

TABLE 15-continued

Calculated ASD where:
$daf_{<x,y,z>,i}$ is the duration adjustment factor for the $i^{th}$ detection in detection category <x,y,z>,
duration*$_{<x,y,z>,i}$ is the duration* value for the $i^{th}$ detection in detection category <x,y,z>, and
$n_{<x,y,z>}$ is the number of individual detections in detection category <x,y,z>.

As previously mentioned, the Image Monetary Indicator (IMI) of a signage package is preferably a function a standard benchmark, such as the negotiated 30-second spot rate (n30ss$) for a televised event and is also a function of other factors, such as the adjusted signage duration, TV ratings for the event, and sponsorship tier adjustment factors. The IMI is computed over a set of detections.

The IMI is calculated as follows:

TABLE 16

Calculated IMI $$SMV = \frac{ASD}{30} \times n30ss\$ \times *sponsorship.adj.factor* \times tv.adj.factor$$

where:
ASD is the Adjusted Signage Duration
n30ss$ is the negotiated 30-second spot value for the event.
* sponsorship.adj.factor * the adjustment factor for sponsorship tier.
tv.adj.factor the adjustment factors for the TV ratings of the event.

The *sponsorship.adj.factor* reflects adjustments in the negotiated 30-second spot value for a sponsor.

The TV.adj.factor accommodates accounting for actual ratings of a show determined to be significantly different than the anticipated rating values. The IMI adjusts accordingly. Actual ratings that are significantly higher than the anticipated ratings will result in an upward adjustment in the IMI. Actual ratings that are significantly lower than the anticipated ratings will result in a downward adjustment in the IMI.

Actual ratings are considered to be significantly different than anticipated ratings if the anticipated rating falls outside the published confidence range of the realized rating for the event of interest.

For example, suppose an event's realized rating is published as p with an error of plus of minus e and that the anticipated rating had been determined to be q. Then, q is considered to be significantly different that p if q≤(p−s) or if q≥(p+s). In the former case the IMI is adjusted down. In the later case the IMI is adjusted upward. If (p−s)≤q≤(p+s) then no adjustment is made. The IMI can also be adjusted based on other factors.

The TV.ad.factor is computed as described in Table 17.

TABLE 17

Computed TV.adj.factor tv.adj.factor = 1 + *tvadj* if q > (p + e),
tv.adj.factor = 1 − *tvadj* if q < (p − e),
tv.adj.factor = 1 otherwise
where
*tvadj* is a predetermined value adjustment fraction,
q is the anticipated TV rating value,
p is the actual TV rating for the appropriate set of detections, and
e is the published sampling error for p.

Application Parameters

The values provided in Table 18 below are exemplary values and are provided merely to illustrate the III/IMI calculation algorithms.

TABLE 18

| | Parameter | Value | Description |
|---|---|---|---|
| 1 | *min-dur-cat-val* | 1 | The set of parameters defines the ranges of category label values for duration, size, and isolation. Category labels are ranges of consecutive integers between these defined values. |
| 2 | *max-dur-cat-val* | 3 | |
| 3 | *min-size-cat-val* | 1 | |
| 4 | *max-size-cat-val* | 3 | |
| 5 | *min-iso-cat-val* | 1 | |
| 6 | *max-iso-cat-val* | 2 | |
| 7 | *dur-min* | 0.6 | The set of parameters that determine the boundaries for the duration categories. |
| 8 | *dur-1-2* | 1.5 | |
| 9 | *dur-2-3* | 3.5 | |
| 10 | *dur-max* | 10 | |
| 11 | *dur-flat* | 15 | The point in time at which the devaluation of excess duration flattens out and becomes constant after declining. |
| 12 | *dur-adj-floor* | .20 | The minimum level to which the valuation of duration excess time will drop. |
| 13 | *DAF-max* | 1.0 | The maximum value allowed for duration adjustment factors 0 < *DAF-max* ≤ 1.0; *DAF-min* < *DAF-max* |
| 14 | *DAF-min* | 0.1 | The minimum value allowed for duration adjustment factors 0 ≤ *DAF-min* < 1.0 |
| 15 | *size-inc-factor* | 2 | The rate at which the IDS-cat value increases for a one unit increase in the detection's size category. |
| 16 | *iso-1-seed-value* | 1 | The IDS-cat value for a s(1), d(1), non-isolated detection |
| 17 | *iso-2-seed-value* | 2 | The IDS-cat value for a s(1), d(1), isolated detection |
| 18 | *n30ss$* | | The negotiated 30-second spot value |
| 19 | *sponsorship-adj-factor* | 0.75 | The 30-second spot sponsorship type index factor 1.00 - Event sponsorship 0.80 - Presenting sponsorship |
| 20 | *tvadj* | .10 | The TV-rating adjustment factor |
| 21 | p | | The published tv-rating for the event |
| 22 | e | | The published error on the published tv-rating for the event |
| 23 | q | | The anticipated tv-rating for the event |
| 24 | *IDS-adj-factor-table* | | A data structure that maps detection type values to appropriate adjustment factors. |
| 25 | *IDS-table* | | A data structure that maps detection class indexes to IDS category values. |

Those skilled in the art will readily appreciate the vast uses for the methods described herein, but not detailed by the letter for the sake of feasibility. Moreover, many different arrangements of the various components depicted, as well as components not shown, are possible without departing from the spirit and scope of the present invention. Those skilled in the art will appreciate the litany of additional network components that can be used in connection with the present invention. The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention Certain features and subcombinations are of utility and may be employed without reference to other features and subcombinations and are contemplated within the scope of the claims. Not all steps listed in the various figures need be carried out in the specific order described. Not all steps of the aforementioned flow diagrams are necessary steps.

The invention claimed is:

1. A method for quantifying potential viewer awareness of advertising content that is within a source of media, the method comprising:
   storing, in a computer readable medium, the source of media, thereby providing a stored source of media;
   segmenting the stored source of media into a plurality of segments of interest;
   receiving an identification of one or more advertisement detections that appear in the plurality of segments, wherein the one or more advertisement detections were made without employing image-recognition software;
   associating one or more attributes with each of the segments, wherein the one or more attributes include a size indication, a duration indication, and an isolation indication associated with the one or more advertisement detections;
   based on the attributes, categorizing each of the segments into a defined category to derive a plurality of individual detection scores; and
   aggregating the individual detection scores to provide one or more valuation scores; and
   generating one or more reports related to the one or more advertisement detections.

2. The method of claim 1, wherein the source of media includes one or more of:
   a source of video;
   a source of audio; and
   combinations thereof.

3. The method of claim 2, wherein the source of video includes at least one of:
   a live feed;
   a streaming-video segment;
   a previously recorded video segment; and
   combinations thereof.

4. The method of claim 3, wherein the plurality of segments includes a plurality of frames or frame sets.

5. The method of claim 4, wherein receiving an identification of one or more advertisement detections comprises:
   receiving input corresponding to the one or more attributes by means of a user interface.

6. The method of claim 5, wherein the user interface is operable to receive commands from a user, wherein the user is a human being.

7. The method of claim 6, wherein the user interfaces is further operable to automatically parse the received commands.

8. The method of claim 7, wherein the user interface is further operable to prevent the user from advancing past an unviewed frame.

9. The method of claim 1, wherein:
   the size indication indicates a portion of screen real estate consumed by the one or more advertisement detections;
   the duration indication indicates a length of time that the one or more advertisement detections was viewable; and
   the isolation indication indicates whether a first advertisement detection associated with a first sponsor appears with a second advertisement detection associated with a second sponsor.

10. The method of claim 9, wherein additional attributes are included to provide one or more valuation scores, the additional attributes include:
    a screen-location identifier;
    a source identifier that indicates a location upon which the one or more advertisement detections appeared; and
    an image-quality identifier.

11. The method of claim 9, wherein aggregating the individual detection scores includes summing the individual detection scores to provide a sum.

12. The method of claim 11, wherein aggregating the individual detection scores includes enriching the individual detection scores with additional information, the additional information including:
    a sponsorship-tier level;
    a viewing-audience-size number; or
    a graphics indication that indicates whether an advertisement detection is a generated graphic;
    an on-air mention indication that indicates whether an advertisement detection is an on-air mention, the on-air mention including an audible indication of a sponsor, including the sponsor's name or a jingle associated with the sponsor;
    a product-placement indication;
    a ratings factor; and
    combinations thereof.

13. The method of claim 12, further comprising employing the sum to determine a monetary valuation of the advertisement detections.

14. A method for valuing advertising content that is within a source of media, the method comprising:
    storing, in a computer readable medium, a video source that contains a plurality of sponsorship images;
    receiving an identification of the plurality of sponsorship images, wherein the sponsorship images were identified without employing image-recognition software;
    assigning attributes to each occurrence of the sponsorship images;
    based on the attributes, categorizing the occurrences into a plurality of categories;
    based on the categories, providing a set of indexes respectively associated with the occurrences;
    aggregating the occurrences;
    associating the aggregated occurrences with additional valuation information, which additional valuation information includes one or more of
        (1) a screen-location identifier,
        (2) a source identifier that indicates a location upon which the one or more advertisement detections appeared, and
        (3) an image-quality identifier;
    providing from the associated aggregated occurrences an index factor to be applied to an advertising-valuation benchmark; and
    generating one or more reports related to the advertising content.

15. The method of claim 14, wherein valuing the advertising content comprises determining a monetary value associated with the advertising content.

16. The method of claim 15, wherein determining a monetary value comprises applying the index factor to a flat-rate advertising metric, the flat-rate advertising metric including a 30-second spot rate for a commercial.

* * * * *